(12) United States Patent
Deshmukh et al.

(10) Patent No.: US 10,429,811 B2
(45) Date of Patent: Oct. 1, 2019

(54) SYSTEMS AND METHODS FOR TESTING CONVERGENCE OF CLOSED-LOOP CONTROL SYSTEMS

(71) Applicant: Toyota Motor Engineering & Manufacturing North America, Inc., Erlanger, KY (US)

(72) Inventors: Jyotirmoy V. Deshmukh, Torrance, CA (US); James P. Kapinski, Redondo Beach, CA (US); Xiaoqing Jin, Torrance, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 637 days.

(21) Appl. No.: 15/093,975

(22) Filed: Apr. 8, 2016

(65) Prior Publication Data

US 2017/0293285 A1  Oct. 12, 2017

(51) Int. Cl.
*G05B 17/02* (2006.01)
*G05B 19/042* (2006.01)

(52) U.S. Cl.
CPC ........ *G05B 19/0426* (2013.01); *G05B 17/02* (2013.01); *G05B 19/0428* (2013.01)

(58) Field of Classification Search
None
See application file for complete search history.

(56) References Cited

U.S. PATENT DOCUMENTS

| 5,347,446 A * | 9/1994 | Iino ............... G05B 13/048 700/29 |
| 5,483,462 A | 1/1996 | Chiang |
| 6,370,467 B1 | 4/2002 | Kimbrough |
| 6,801,881 B1 | 8/2004 | Shah |

(Continued)

FOREIGN PATENT DOCUMENTS

| CN | 101739334 | 6/2010 |
| CN | 202929473 | 5/2013 |
| CN | 102591207 | 8/2013 |

OTHER PUBLICATIONS

Prajna et al, "Nonlinear control synthesis by sum of square optimization: a Lyapunov-based approach," Control Conference, 2004. 5th Asian. vol. 1. IEEE, 2004.

(Continued)

*Primary Examiner* — Thomas C Lee
*Assistant Examiner* — Gary Collins
(74) *Attorney, Agent, or Firm* — Dinsmore & Shohl, LLP

(57) ABSTRACT

Systems and methods for evaluating closed-loop control systems are disclosed. In one embodiment, a method of evaluating a control system includes determining, using a processing device, one or more convergence classifier functions from a closed-loop model, wherein the one or more convergence classifier functions convey convergent behavior of the closed-loop model over a pre-determined period of time. The method further includes generating, using the processing device, a plurality of test cases of an input space of the closed-loop model under evaluation, and determining, using the processing device, whether one or more individual (Continued)

test cases of the plurality of test cases do not satisfy the one or more convergence classifier functions.

20 Claims, 13 Drawing Sheets

(56) References Cited

U.S. PATENT DOCUMENTS

| | | | |
|---|---|---|---|
| 6,845,471 | B1 | 1/2005 | Huth |
| 7,080,055 | B2 | 7/2006 | Campos et al. |
| 7,574,334 | B2 | 8/2009 | Tiwari et al. |
| 8,244,384 | B2 | 8/2012 | Pachner et al. |
| 8,352,222 | B2 | 1/2013 | Sankaranarayanan et al. |
| 8,620,517 | B2 | 12/2013 | Caveney et al. |
| 8,745,588 | B2 | 6/2014 | Kawashima et al. |
| 9,026,998 | B2 | 5/2015 | Mizrahi |
| 9,195,222 | B2 | 11/2015 | Kapinski et al. |
| 2004/0024750 | A1 | 2/2004 | Ulyanov et al. |
| 2004/0030420 | A1 | 2/2004 | Ulyanov et al. |
| 2005/0049728 | A1* | 3/2005 | Pado .................. G05B 13/027 700/48 |
| 2006/0293817 | A1 | 12/2006 | Hagiwara et al. |
| 2013/0278223 | A1 | 8/2013 | Li et al. |
| 2014/0201723 | A1* | 7/2014 | Kapinski .............. G05B 13/02 717/135 |
| 2016/0048375 | A1* | 2/2016 | Balkan ................ G06F 16/245 717/104 |

OTHER PUBLICATIONS

Tanaka et al, "A multiple Lyapunov function approach to stabilization of fuzzy control systems," Fuzzy Systems, IEEE Transactions on 11.4 (2003): 582-589.

Topcu et al, "Local Stability analysis using simulations and sum-of-squares programming," Automatica 44, 10 (2008): 2669-2675.

Walsh et al, "Stability analysis of networked control systems," Control Systems Technology, IEEE Transactions on 10.3 (2002): 438-446.

Zhang et al, "Stability of networked control systems," Control Systems, IEEE 21.1 (2001):84-99.

Vandenberghe et al, Semidefinite Programming. SIAM Review, 38(1):49-95, Mar. 1996.

R. Alur et al, Automatic symbolic verification of embedded systems. IEEE Transactions on Software Engineering, 22(3)181-201, Mar. 1996.

Ball et al, Slam and static driver verifier: Technology transfer of formal methods inside microsoft. In Integrated Formal Methods, vol. 2999 of Lecture Notes in Computer Science, pp. 1-20. Springer Berlin Heidelberg, 2004.

Boyd et al, Linear Matrix Inequalities in System and Control Theory, vol. 15 of SIAM Studies in Applied Mathematics. SIAM, 1994.

Branicky, Multiple lyapunov functions and other analysis tools for switched and hybrid systems. IEEE Transactions on Automatic Control, 43(4):475-482, Apr. 1998.

Parrilo, Structured Semidefinite Programs and Semialgebraic Geometry Methods in Robustness arid Optimization. PhD thesis, California Institute of Technology, 2000.

Henzinger et al, What's Decidable about Hybrid Automata? Journal of Computer and System Sciences, pp. 373-382, 1995.

STURM, Using SeDuMi 1.02, A MATLAB Toolbox for Optimization over Symmetric Cones. Optimization Methods arid Software, 11/12(1-4):625-653, 1999.

Loferg, Johan, YALMIP: A toolbox for modeling and optimization in MATLAB. In Proceedings of the CACSD Conference, Taipei, Taiwan, 2004.

Bombara et al, "A decision tree approach to data classification using signal temporal logic," Hybrid Systems: Computation and Control (HSCC), Vienna Austria (10 pages, 2016).

Donze, "Breach, a toolbox for verification and parameter Synthesis of hybrid systems," Verimag Laboratory 2, http://www-verimag.imag_fr/-donze/tool.shtml (4 pages, undated).

Dreossi et al, "Efficient guiding strategies for testing of temporal properties of hybrid systems," Verimag, University of California, Toyota Technical Center (16 pages, undated).

Papachristodoulou et al, "On the construction of Lyapunov functions using the sum of squares decomposition," Proceedings of IEEE CDC (2002): 1-6.

Donze et al, "Robust satisfaction of temporal logic over real-valued signals," CNRS-Verimag, Fieres, France (16 pages, undated).

Annapureddy et al, "S-Taliro: a tool for temporal logic falsification for hybrid systems," Arizona State University, University of Colorado (4 pages, undated).

Balkan et al, "Simulation-guided contraction analysis," Department of Electrical Engineering, University of California Toyota Technical Center (8 pages, undated).

Kapinski et al, "Simulation-guided Lyapunov analysis for hybrid dynamical systems," Toyota Technical Center, University of Colorado, Carnegie Mellon University (10 pages, undated).

Deshmukh et al, "Stochastic local search for falsification of hybrid systems," Toyota Technical Center, Verimag (16 pages, undated).

Jones et al, "Anomaly detection in cyber-physical systems: a formal methods approach," 53rd IEEE Conference on Decision and Control, (2014 ): 848-853.

<Apinski et al, "Discovering forward invariant sets for Nonlinear dynamical systems," Toyota Technical Center (6 pages, undated).

Kong, Zhaodan, et al. "Temporal logic inference for classification and prediction from data." Proceedings of the 17th international conference on Hybrid systems: computation and control. ACM, 2014.

* cited by examiner

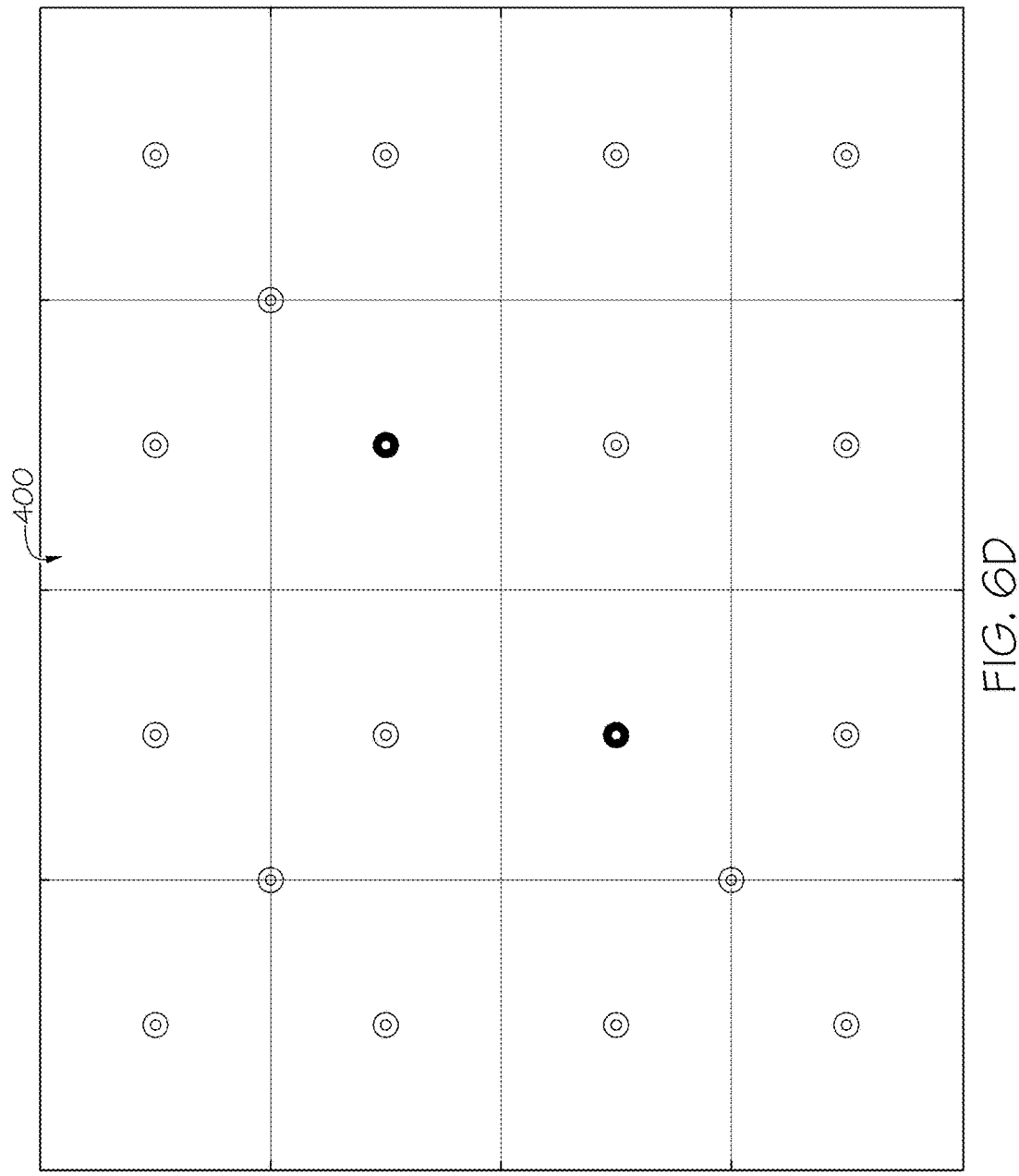

SYSTEMS AND METHODS FOR TESTING CONVERGENCE OF CLOSED-LOOP CONTROL SYSTEMS

TECHNICAL FIELD

The present specification generally relates to systems and methods for evaluating closed-loop control systems and, more particularly, systems and methods for evaluating closed-loop control systems that automatically determine undesirable behaviors in closed-loop control systems.

BACKGROUND

Embedded software for controlling the operation of complex real-world systems is often designed using the model-based development (MBD) paradigm. In this paradigm, designers develop a model of the physical aspects of the system, known as the plant model 10, and also develop a model of the embedded real-time software, known as the controller model 20, as shown in FIG. 1. Typically, such models are developed using a block-diagram based visual programming language such as Simulink® (a product of Mathworks in Natick, Mass.). Once the plant model 10 and the controller model 20 are developed, designers then combine these models to obtain a closed-loop model 30. The inputs 40 to the closed-loop model 30 are exogenous inputs to the plant model 10 (such as ambient temperature, atmospheric pressure, driver input, pilot commands, etc.), and outputs of the plant model 10 typically include controlled signals of the plant model 10. Typically, a closed-loop model 10 also has a number of parameters including initial conditions of various state-carrying elements in the model. This includes initial values for memory elements in the controller model 20 and the initial configuration for the physical elements in the plant model 10.

The purpose of an embedded control system is to respond to disturbances from the environment or changes to a set-point performed by the plant operation. This may involve ensuring that a particular controlled signal tracks changes in a given (fixed or dynamic) reference value. In order to do so, the controller provides inputs to the plant to regulate its behavior.

In many instances, control designers articulate the correctness of a closed-loop control system using mathematical notions of dynamic system stability. Determining if a closed-loop model 30 performs as expected is usually done by observing the closed-loop system performance in response to dynamic disturbances in its environment. The observations are often expected to indicate stable or convergent behavior, in some sense, but checking for this behavior can be challenging and usually consists of applying a collection of ad-hoc methods.

Stability analysis can be employed to determine whether a system design will exhibit convergent behaviors, but formally checking whether a system is stable requires rigorous mathematical reasoning. Checking stability in a strict mathematical fashion is infeasible in an engineering setup, where the exact symbolic form of the closed-loop system dynamics is unavailable. Even when such a precise description of the system behaviors is available, exact reasoning is often computationally infeasible. These formal checks are not often made on detailed industrial control design models, for two main reasons. First, the models are too complex, in at least the following senses: (1) they contain many state variables, and (2) they contain nonlinearities and implementation details such as controller output and sensor input saturation, transport delays due to computation times and communication delays, and quantization due to fixed-point number representations. Second, models are often represented in modeling frameworks that have proprietary semantics, such as Simulink®. For these reasons, test-based checks of stability-related properties are used in place of formal techniques.

As a result, in engineering practice, control designers often rely on control designers' experience using subjective notions of convergence. This involves observing the signal of interest and checking visually whether it converges to the desired set-point within a reasonable amount of time. This process is referred to as the stability test. Typically, a violation of the stability test manifests as oscillatory behavior around the reference value. Control designers call such behavior "hunting" or "ringing" behavior. Due to engineering concerns, prolonged hunting or ringing behavior is undesirable. In effectively testing a closed-loop control system, control designers would like to identify parameter settings (initial conditions/initial parameter values) or exogenous input values that lead the system to violate the stability test.

The manual testing and classification procedure requires the designer to select system parameters or test conditions, observe the resulting signal behaviors, and decide whether the signal converges to the desired value within reasonable time. This procedure is ad-hoc and relies on subjective notions of convergence, but it has the benefit that it utilizes engineering insight and experience. A drawback, however, is that such a subjective testing process is difficult to automate, as the convergence properties are not machine-checkable.

Accordingly, alternative systems and methods for evaluating a closed-loop control system to automatically determine stability and undesirable behaviors are desired.

SUMMARY

In one embodiment, a method of evaluating a control system includes determining, using a processing device, one or more convergence classifier functions from a closed-loop model, wherein the one or more convergence classifier functions convey convergent behavior of the closed-loop model over a pre-determined period of time. The method further includes generating, using the processing device, a plurality of test cases of an input space of the closed-loop model under evaluation, and determining, using the processing device, whether one or more individual test cases of the plurality of test cases do not satisfy the one or more convergence classifier functions.

In another embodiment, a system for evaluating a control system includes one or more processing devices, and a non-transitory computer-readable medium storing computer-executable instructions. When the computer-executable instructions are executed by the one or more processing devices, the one or more processing devices determines one or more convergence classifier functions from a closed-loop model, wherein the one or more convergence classifier functions convey convergent behavior of the closed-loop model over a pre-determined period of time, generates a plurality of test cases of an input space of the closed-loop model under evaluation, and determines whether one or more individual test cases of the plurality of test cases do not satisfy the one or more convergence classifier functions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 6C-6F graphically depict iterations of adaptive grid-based sampling over a parameter space according to one or more embodiments described and illustrated herein;

DETAILED DESCRIPTION

Figure 1:
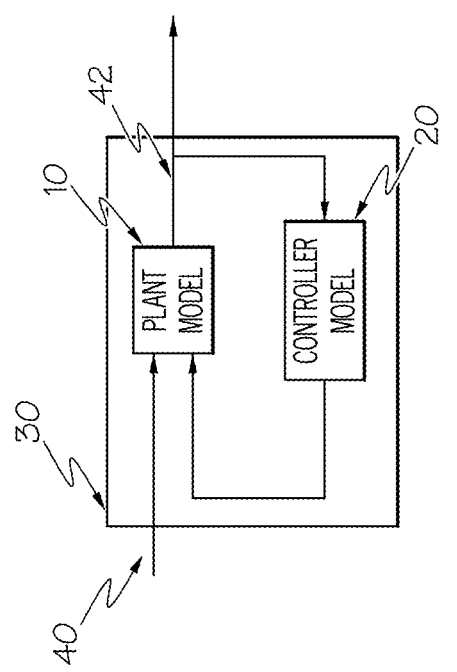
FIG. 1 schematically depicts an example closed-loop system model.

Referring generally to the appended figures, embodiments of the present disclosure are directed to systems and methods for evaluating closed-loop control systems. Embodiments of the present disclosure automatically determine undesirable behaviors in the closed-loop control system by constructing convergence classifier functions in a first phase, and automatic test generation for the closed-loop control system in a second phase.

More particularly, embodiments provide automated techniques to identify non-converging behaviors in embedded control system designs. The processes described herein treat the system as a black-box, and allow the control designer to indicate the model parameters, inputs and outputs that are of interest. The processes described herein support a multiplicity of convergence notions, such as those based on notions of Lyapunov stability and also convergence requirements based on temporal logic formulae. Embodiments may be applied in the context of testing models created in the controller-design phase, or it can be applied in a scenario such as hardware-in-the-loop testing.

The framework of the embodiments described herein is divided into two distinct phases. In the first phase, the testing tool uses a heuristic to construct a function that distinguishes convergent behaviors from those that do not converge. The second phase uses the constructed function to perform search-based testing, i.e., it uses the function to guide the search for behaviors most likely to violate stability tests.

As such, the framework provides for performing automatic testing of a closed-loop system with respect to stability-like convergence properties. One goal of the disclosed framework is to identify potential violations of the stability test (i.e., undesirable behavior).

DEFINITIONS

"Output trace." An output trace of a signal x of a model M is defined as a sequence of time-value pairs $(t_0, x_0), \ldots, (t_N, x_N)$, where $t_0=0$, and $t_N$ is the time duration for which the simulation is run (also called simulation time horizon). The times in this sequence obey the relation that $t_{j+1} > t_j$ for any j in [0, N−1]. The set $\{t_0, \ldots, t_N\}$ is called the domain of the output trace, and the set X from which the values $x_0, \ldots, x_N$ can appear is called the range of the output trace. Note that, in general, X is a subset of $\mathbb{R}^n$, where $\mathbb{R}$ denotes the set of real numbers. The number n is called the dimension of the output signal.

"Convergence classifier." A convergence classifier C is a function that maps a given output trace to a real number belonging to an interval of the real line containing 0, such that $C(x) > 0$ if the trace x is deemed convergent by the control designer, and $C(x) \leq 0$ otherwise.

"Undesirable behavior." Undesirable behavior of a closed-loop model is behavior exhibited by an output trace that yields $C(x) \leq 0$ as defined by the selected convergence classifier. As used herein, the phrase "non-convergent behavior" is used interchangeably with "undesirable behavior."

"Lyapunov-like function." A Lyapunov-like function is a function from a range of an output trace of a signal x to R, such that:

$V(x_j) > 0$ for all j in [0, N], and $V(x_j) - V(x_{j+1}) > \alpha(|x|)$ for all j in [0, N−1], where $\alpha$ is an increasing and continuous function such that $\alpha(0)=0$.

Standard Lyapunov functions are defined over system state variables instead of system outputs, and are required to decrease over any system trajectory. By contrast, Lyapunov-like functions are defined over system outputs and are only required to decrease over observed output traces. The intuition behind Lyapunov-like functions is that they demonstrate that the system output signals are, in some sense, converging. The properties based on Lyapunov-like functions considered herein quantify the degree to which a given Lyapunov-like function decreases over a set of output traces.

"ISS Lyapunov-like function." An input-to-state stability (ISS) Lyapunov-like function is a function from a range of an output trace of a signal x to R, such that:

$V(x_j) > 0$ for all j in [0, N], and $V(x_j) - V(x_{j+1}) > \alpha(|x|) - \gamma(|u|)$ for all j in [0, N−1], where $\alpha$ and $\gamma$ are strictly increasing and continuous functions such that $\alpha(0)=0$ and $\gamma(0)=0$. ISS Lyapunov-like functions capture the degree to which the system outputs converge in the presence of disturbance inputs. As used herein, "strictly increasing" means that the functions never decrease.

Figure 2:
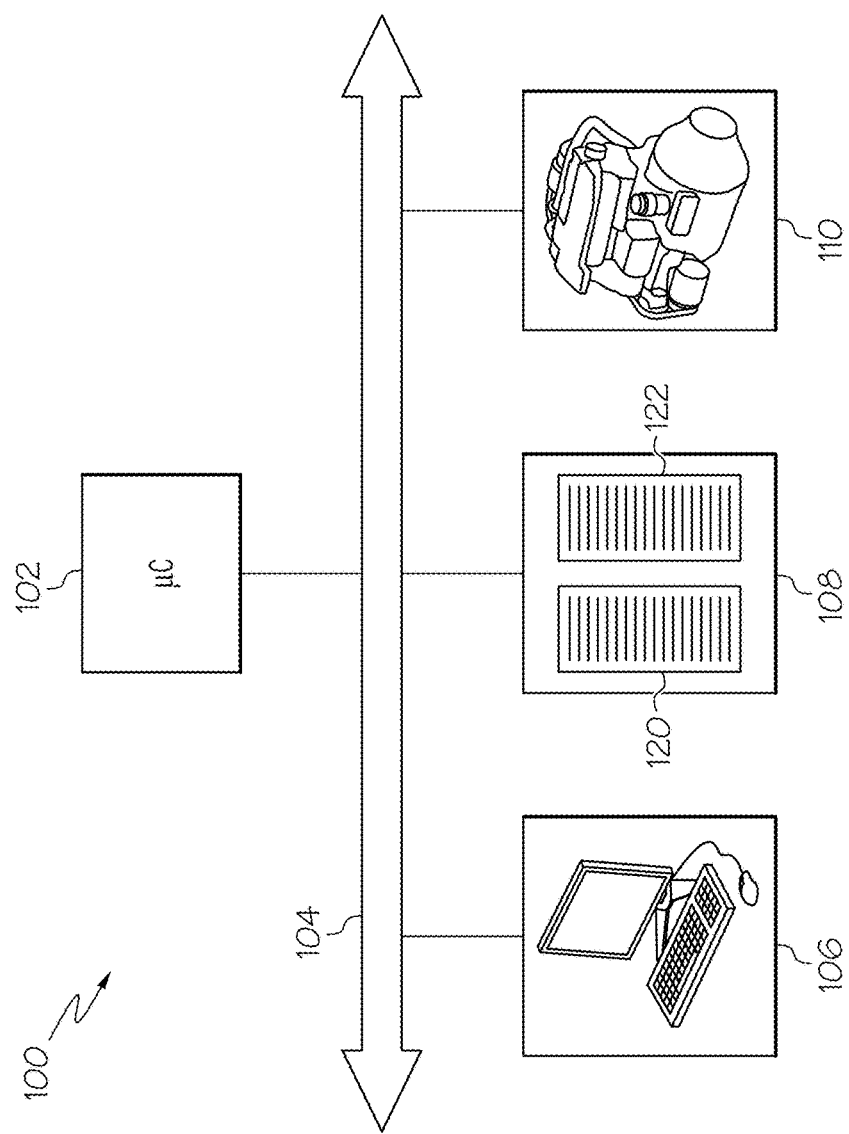
FIG. 2 schematically depicts a computing device configured to generate test cases that demonstrate non-converging system behaviors as described and illustrated herein.

Referring now to FIG. 2, exemplary hardware components of a computing device 100 (or system) used to implement the methods described herein are schematically illustrated. It should be understood that embodiments are not limited to the components and the configuration depicted in FIG. 2, and that other components and configurations may be used. The computing device 100 may be configured as a general purpose computer or an application-specific computing device. The computing device 100 may be any computer capable of running MBD programs and semidefinite programming tools described herein.

Generally, the illustrated computing device 100 may be embodied as a separate computing device, a plurality of networked computing devices and/or a computer-program product comprising non-transitory computer-readable medium for evaluating software and control systems for evaluating a closed-loop model or system for undesirable behaviors. It is noted that the systems and methods for evaluating a closed-loop model may be executed by a computing device that is external to the illustrated computing device 100 in some embodiments. For example, a first computing device may be used for MBD purposes, while a second computing device may be used for debugging and evaluation purposes.

The example computing device 100 illustrated in FIG. 2 comprises at least one processor 102, input/output hardware 106, a non-transitory computer-readable medium 108 (which may store convergence classifier function generation and test generation logic 120, for example, and the software code 122 of the controller model, for example), and a plant model representation 110 that is configured to simulate the actual system for which the software code is designed, such as a motor, a vehicle, an electronic braking system, and the like. It is noted that, in some embodiments, the computing device 100 may receive data from an actual physical plant (e.g., engine, vehicle) rather than, or in conjunction with, the computer simulated plant representation 110. Other components may also be provided, such as network hardware (e.g., modem, LAN port, wireless fidelity (Wi-Fi) card, WiMax card, mobile communications hardware, and/or other hardware for communicating with other networks and/or devices.).

The non-transitory computer-readable medium 108 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the computer-readable medium 108 may be configured to store, among other things, convergence classifier function generation and test generation logic 120 and the software code 122 of the controller model, for example. In some embodiments, the plant representation 110 may also be stored on the computer-readable medium 108, or externally from the computing device 100. A local interface 104 is also included in FIG. 2 and may be implemented as a bus or other interface to facilitate communication among the components of the computing device 100. As stated above, in some embodiments, the plant representation 110 may not be provided by computer simulation but rather an actual physical plant under evaluation (e.g., an engine, a vehicle, and the like).

The at least one processor 102 may include any processing device(s) configured to receive and execute instructions (such as from the computer-readable medium 108). The input/output hardware 106 may include any hardware and/or software for providing input and receiving output to and from the computing device 100, such as, without limitation a keyboard, mouse, display, camera, microphone, speaker, touch-screen, and/or other device for receiving, sending, and/or presenting data.

It should be understood that the computer-readable medium 108 may reside local to and/or remote from the computing device 100 and may be configured to store one or more pieces of data for access by the computing device 100 and/or other components. It should also be understood that the components illustrated in FIG. 2 are merely exemplary and are not intended to limit the scope of this disclosure. More specifically, while the components in FIG. 2 are illustrated as residing within a single computing device 100, this is a non-limiting example. In some embodiments, one or more of the components may reside external to the computing device 100, such as within an external computing device that is communicatively coupled to one or more computing devices.

Figure 3:
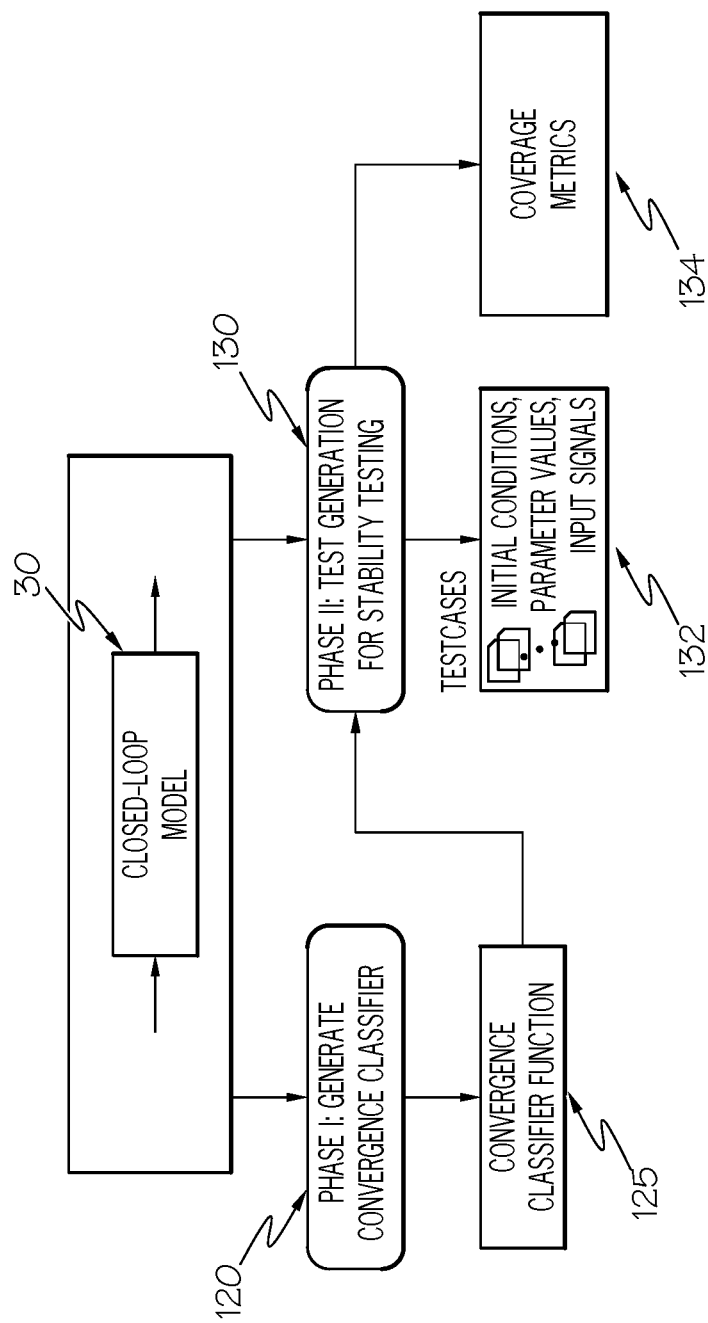
FIG. 3 schematically depicts an example framework for evaluating closed-loop control systems according to one or more embodiments described and illustrated herein.

Referring now to FIG. 3, an example framework for evaluating closed-loop control systems is schematically illustrated. The framework generally comprises a Phase I 120 wherein convergence classifier(s) are generated and a Phase II 130 wherein tests guided by the convergence classifier(s) of phase 1 are generated. Both Phase I 120 and Phase II 130 receive inputs from a closed-loop model 30 under evaluation.

As described in more detail below, in Phase I 120, a convergence classifier function may be automatically synthesized based on a type of convergence classifier function selected by a user (e.g., a control designer). The type of convergence classifier function can correspond to any of a number of convergence notions, such as Lyapunov-like functions or temporal logic formulae. The convergence classifier function generalizes the characteristic of convergent behaviors, and is able to distinguish convergent behaviors from non-convergent ones in the following way. Let $\psi c$ be the convergence property as defined by the convergent classifier function, and consider, y, the output trace of model M under parameter p. If the convergent classifier function evaluated on output trace y is positive, then $y \models \psi c$; alternatively, if the convergent classifier function on output trace y is negative, then $y \not\models \psi c$.

In Phase II 130, a falsification method is used to generate test cases that exhibit non-convergent behaviors. This is performed using a global optimizer to select the system parameters and inputs, using the convergent classifier as a cost function. Any output trace y resulting from a parameter p for which the convergence classifier function produces a negative value corresponds to behaviors for which $y \not\models \psi c$ (i.e., undesirable behaviors). The output from the framework shown in FIG. 3 may be a collection of parameter values, input signal values, and initial condition values that correspond to output traces that represent non-convergent behaviors.

Phase I—Convergent Classifier Functions

The convergent classifier function provides a way to quantify the degree of acceptability of a given output trace derived from a closed-loop model M.

Classifiers can be used to define a wide variety of system behaviors, including simple properties such as bounds on overshoot values or settling times, but also complex properties such as any of those expressible in Signal Temporal Logic (STL). Embodiments described herein can be easily extended to support any of those properties, but the focus in this disclosure is on classifiers that capture so-called convergent behavior. Generally, a convergent behavior is any output trace whose values approach within a sufficient distance of some expected value within a satisfactory amount of time. Formalizing an appropriate notion of convergence that fits every testing scenario can be challenging, as selecting an appropriate definition can depend on the particular system domain and the testing context.

One reason that constructing a canonical notion of convergence may be difficult is that the notion can be qualitative in nature. In engineering practice, control designers may deem a system output trace as well-behaved if the signal has some desirable shape, which is known intuitively to the designer (based on past experience) but is difficult to capture precisely in a mathematical sense.

Figure 4A:
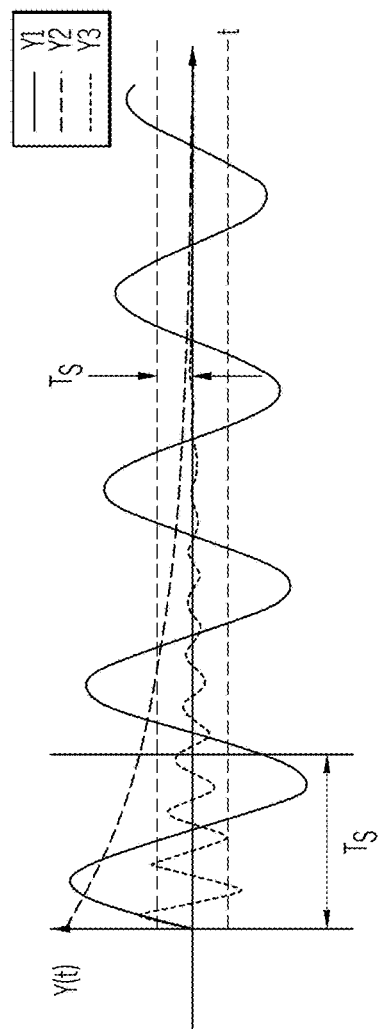
FIGS. 4A and 4B graphically depict example output traces that exhibit converging behavior according to one or more embodiments described and illustrated herein.
Figure 4B:
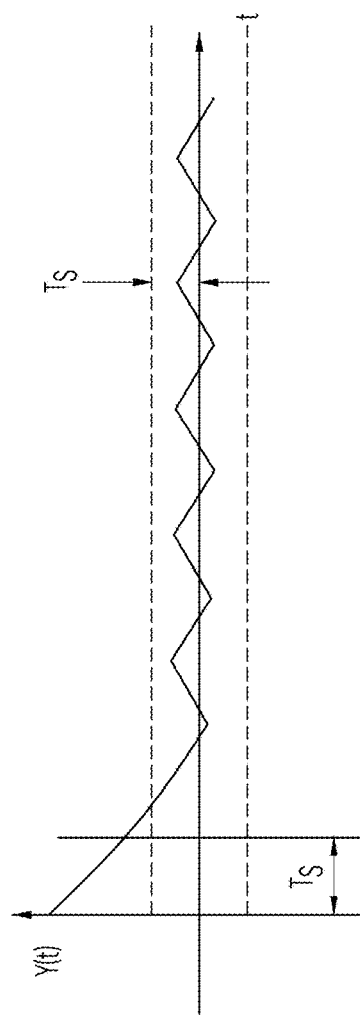

Consider the examples illustrated in FIGS. 4A and 4B, which demonstrate why it is not practical to consider a universal notion of convergence. FIG. 4A illustrates three output traces that all exhibit convergent behavior, in the sense that their respective envelopes approach the y(t)=0 value. These are the types of behaviors that a designer expects to see for many types of feedback control systems. These behaviors can be naturally captured using a Lyapunov-like function (described in detail below), but note that they cannot be captured easily with an STL formula (described in detail below). To see why this is, consider a standard method to specify convergence using STL, which is to specify a fixed time after which the signals should be within some given range near the y(t)=0 value. In this case, the STL formula is not sufficient, because, for any fixed parameters, the formula would misclassify some signals that continue to converge as non-converging, due to the fixed timing requirement necessary to define the STL formula.

Next, consider the signal shown in FIG. 4B. This is the type of behavior an engineer expects to see for a system that is implementing sampled-data sliding mode control. This signal satisfies a convergence requirement that can be naturally captured in a language like STL by selecting a settling time $\tau_s$ and a region that the signal should remain within $r_s$ after $\tau_s$ seconds. Note, however, that the signal would not satisfy any usual Lyapunov conditions, as the signal does not continually converge to the y(t)=0 value.

As it is difficult to develop a definition of convergence to fit all testing scenarios, the example framework of the present disclosure is compatible with classifiers based on disparate notions of convergence. Described below are non-limiting examples of such classifiers, each of which uses a different method to specify the following general qualities of the system behaviors: (1) there is a certain set-point for the output trace, and as time progresses the output trace value approaches this set-point, and (2) it is desirable for the output trace to approach the set-point quickly enough (in comparison to the time-scale at which the underlying system operates). These example heuristic functions described below are designed to capture this informal notion of convergence in a formal, machine-checkable fashion. Each such function is called a convergence classifier function 125, which is generated and outputted by Phase I 120 of the framework schematically illustrated in FIG. 3.

Temporal Logic-Based Classifiers

Signal Temporal Logic is a formalism that may be used to specify requirements for closed-loop control systems. A formula in STL is built recursively from atomic predicates of the form: $f(x)>0$, where $f$ is some function from X to the real numbers. In addition to Boolean combinations of atomic predicates (such as and, or, negation), STL also defines temporal operators $\Box_I$ (always), $\Diamond_I$ (eventually) and $U_I$ (until), where for each operator I indicates a time interval over which the operator is to be applied.

Assuming that the closed-loop model is excited by a step input at time 0 seconds, the following STL formula specifies the requirement that the error signal representing the absolute difference between the signals x and $x_{ref}$ settles to within μ% within $\tau_{settle}$ seconds. This is commonly known as a settling time requirement.

$$\varphi_{settle} \equiv \Box_{[0,\infty]}(\text{step}(x_{ref}) \rightarrow \Box_{[\tau_{settle},\infty]}(|x-x_{ref}|<\mu x_{ref})), \quad \text{Eq. (1)}.$$

By providing parameters μ, $\tau_{settle}$, control designers can specify a classifier for convergence using STL. Timed-temporal logics such as STL are equipped with quantitative semantics that help define the actual classifier. Using the robust satisfaction value function ρ from Donzé and O. Maler, "Robust satisfaction of temporal logic over real-valued signals," in 8*th International Conference on Formal Modeling and Analysis of Timed Systems,* 2010 for the formula $\varphi_{settle}$ specified above, one way of defining the temporal-logic based classifier is as follows:

$$\text{TLC}_{\varphi_{settle}}(x) = \rho(\varphi_{settle}, x, 0), \quad \text{Eq. (2)}.$$

Lyapunov-Like Function-Based Classifiers

As noted hereinabove, Lyapunov-like functions provide a means to construct classifiers based on traditional notions of stability. A Lyapunov-like function gives an indication as to whether the energy in an output signal is decreasing over runs of the system.

Let R be an interval over the real number line containing the element 0. A Lyapunov-like function V is a function from the range of an output trace of a signal x to R, with the following properties:

$V(x_j) > 0$ for all j in [0, N], and $V(x_j) - V(x_{j+1}) > \alpha(|x|)$ for all j in [0, N−1], where α is an increasing and continuous function such that $\alpha(0)=0$.

An ISS Lyapunov-like function V is a function from the range of an output trace of a signal x to R, with the following properties:

$V(x_j) > 0$ for all j in [0, N], and $V(x_j) - V(x_{j+1}) > \alpha(|x|) - \gamma(|u|)$ for all j in [0, N−1], where α and γ are strictly increasing and continuous functions such that $\alpha(0)=0$ and $\gamma(0)=0$.

It is noted that Lyapunov-like functions may take on many forms. Two example Lyapunov-like functions are provided below.

Sum-of-Squares Lyapunov-Like Function.

A Sum-of-Squares Lyapunov-like function may be defined as $z(x_0)^T M z(x_0)$, wherein M is a n×n matrix of numbers, and z is a vector of monomials over x, and $x_0$ is an initial value for the output trace.

M-Step Lyapunov-Like Function.

An M-step Lyapunov-like function is a quadratic Lyapunov-like function of the form $y^T M y$, where y is a vector representing an n-dimensional signal x over an output trace of length N, and M is an nN×nN matrix.

One example technique for generating Lyapunov-like functions is described in U.S. Pat. No. 9,195,222, which is hereby incorporated herein by reference in its entirety. The example technique collects a predetermined number of output traces and then constructs a Lyapunov-like function that satisfies the Lyapunov-like conditions above on this collection of output traces. This construction can be posed as a linear program or semi-definite program according to the structure of the Lyapunov-like function, and therefore can be performed efficiently. U.S. Pat. No. 9,195,222 also suggests a way to improve the candidate Lyapunov-like functions via black-box optimizers by actively looking for traces that invalidate the current candidate Lyapunov-like function.

Figure 5:
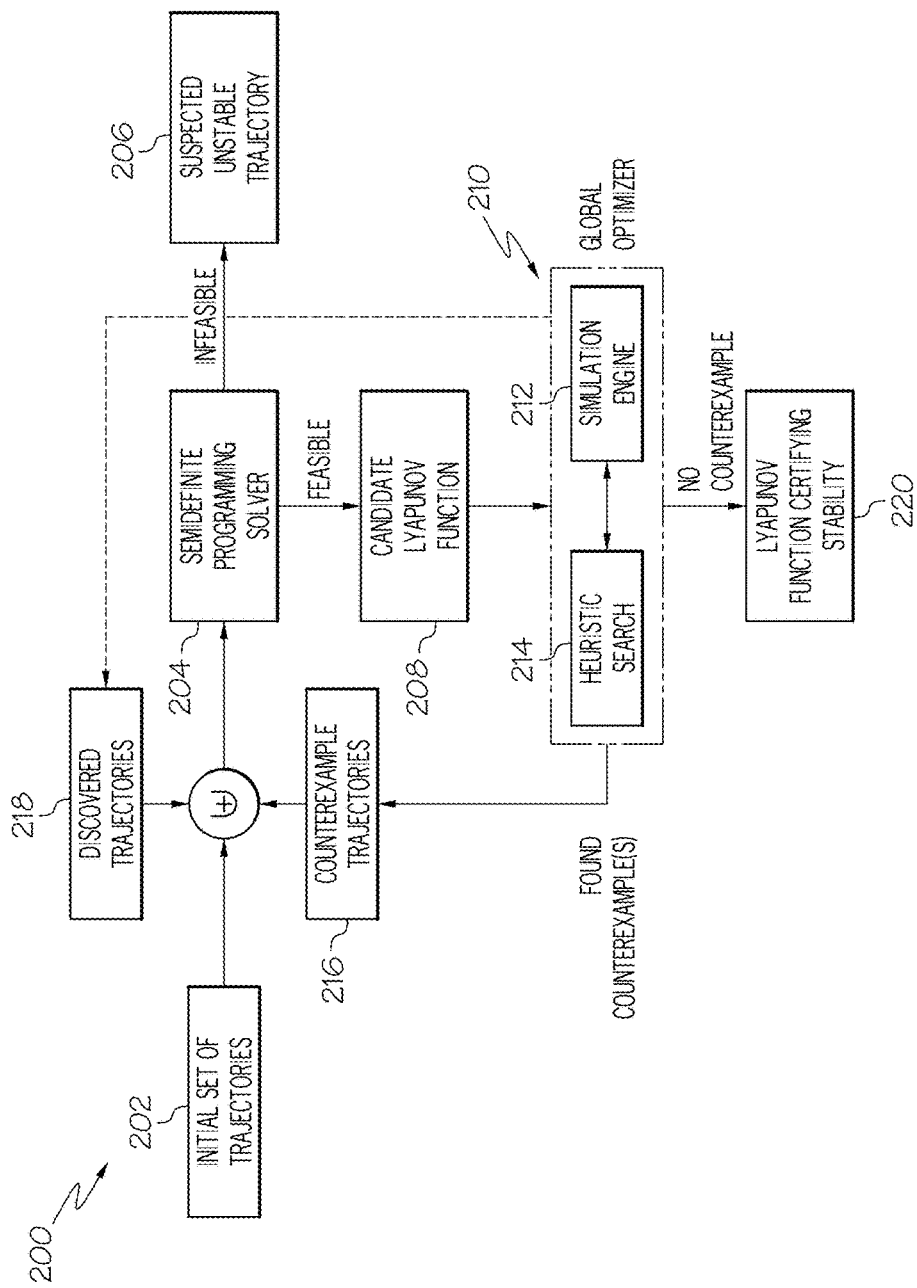
FIG. 5 graphically depicts a flowchart of an exemplary method for generating Lyapunov-like functions according to one or more embodiments described and illustrated herein.

FIG. 5 provides a flowchart of this example technique for generating Lyapunov-like functions. Flowchart 200 illustrates an exemplary method for evaluating the stability of software code for a control system is depicted. The input is a region within the continuous state-space of the dynamical control system that the designer wishes to analyze. An initial set of trajectories are provided at block 202. The initial set of trajectories may include simulation traces received from the simulation engine 212, which may represent simulations based on a range of values for various system parameters of interest. As an example and not a limitation, the simulation engine, using the plant representation 110, may provide trajectories based on an engine that is run from 0 revolutions per minute (RPM) to 3000 RPM over a particular period of time and at particular ambient temperature. The simulation engine may provide outputs regarding any number of parameters based on any number of inputs. Initial trajectories may be selected by selecting specific system parameters, and then demonstrating the system behaviors using the selected parameters. These trajectories may be used as the initial set of trajectories at block 202. It is noted that the simulation engine 212 may use computer simulated trajectories and/or experimental trajectories taken from a physical plant.

The initial set of trajectories is then inputted into a semidefinite programming solver module or a linear programming solver module at block 204. Semidefinite programming is an optimization technique that may be used to address several problems in control design. Semidefinite programming may be used in the optimization of complex systems. The semidefinite programming solver module described herein may be any software package capable of the optimization techniques described herein and may include, but are not limited to, the SeDuMi and YALMIP optimization packages for MATLAB® by MathWorks®.

More specifically, as an example and not a limitation, the semidefinite programming problem solved by the semidefinite programming solver module may be expressed as follows: Let $x(k)$ for $k \in \{1, \ldots, K\}$ be a trace of the system, where $x(k) \in \mathbb{R}^n$. Let $z(k) \in \mathbb{R}^m$ be a vector of monomials in $x(k)$. For example, if $x(k)=[x_1(k)\ x_2(k)]^T$, then $z(k)$ can be $z(k)=[x_1(k)^2\ x_1(k)x_2(k)\ x_2(k)^4]^T$. Let $v(k)=z(k)^T P z(k)$. We take $P \succ 0$ to mean that P is positive definite, that is, for all $z(k) \neq 0$, $z(k)^T P z(k) > 0$. The semidefinite programming problem is to find a feasible solution for the following set of constraints, which are necessary conditions for the system to be Lyapunov stable:

$$P \succ 0; \quad \text{Eq. (3)}$$

$$v(k+1)-v(k) > 0. \quad \text{Eq. (4)}$$

Here, the elements of P are the decision variables for the semidefinite programming solver module. Note that Eq. (3) is a semidefinite programming constraint and Eq. (4) is a linear constraint. A plurality of constraints similar to Eq. (4) are included in each semidefinite programming problem, one for each $x(k)$, $x(k+1)$ pair of points from the collection of traces. The P that results from the semidefinite programming problem defines a Lyapunov candidate function $v(k)$.

At block 204, the semidefinite programming solver module formulates a search for a candidate Lyapunov function using the initial set of trajectories as input. The information from the initial set of trajectories is encoded as constraints that the Lyapunov candidate should satisfy. As stated above, the constraints demand that a potential Lyapunov function candidate satisfy the Lyapunov conditions: (1) that it is a positive definite function, and (2) that it is strictly decreasing.

The closed-loop system model may be considered non-convergent if a Lyapunov function candidate is not found. Optionally, the process may move to block 206, where an indication that software code under evaluation may be non-convergent is provided (e.g., using a graphical user interface). If one or more candidate Lyapunov functions are found (block 208), they are input into a global optimizer at block 210. The global optimizer attempts to refute the one or more candidate Lyapunov functions. Counterexample trajectories are trajectories that violate the Lyapunov conditions. The global optimizer is defined as the simulation engine 212 and a heuristic search component 214 comprising a non-convex, global optimization process that searches for a simulation trajectory that violates the Lyapunov conditions with the one or more candidate Lyapunov functions.

In other words, the simulation engine is run using the constraints provided by the one or more candidate Lyapunov functions.

The simulation engine 212 produces a set of discovered trajectories while searching for counterexample trajectories. If one or more counterexample trajectories are found, they are added to the initial set of trajectories at block 216. The set of discovered trajectories represented by block 218 are also added to the initial set of trajectories and the counterexample trajectories. The initial set of trajectories, the counterexample trajectories, and the discovered trajectories are inputted into the semidefinite programming solver module at block 204, which is run again to find one or more candidate Lyapunov functions based on the updated input. The process is repeated until either no candidate Lyapunov functions are found (block 206), or one or more candidate Lyapunov functions are found but no counterexample trajectories are found such that the process moves to block 220. The software code under evaluation may be deemed stable with increased confidence if one or more candidate Lyapunov functions are found but no counter example trajectories are found. Optionally, an indication regarding the stability of the software code under evaluation may be provided at block 220.

More specifically, the global optimization problem may be formulated as follows:

$$\min_{x(k)} v(k+1) - v(k). \quad \text{Eq. (5)}$$

Here, the P was selected by the previous semidefinite programming solution, $v(k)$ is evaluated at the point $x(k)$ (i.e., the decision variable for the global optimization problem), and $v(k+1)$ is evaluated at the point $x(k+1)$, which is obtained either through simulation or experiment using $x(k)$ as the initial condition. If the solution to Eq. (5) is less than zero, then the candidate Lyapunov function $v(k)$ is rejected, and another semidefinite programming solution is generated.

It is noted that a Lyapunov-like function-based classifier essentially maps a given trace to a real number using the Lyapunov-like function (LLF). One possible way of defining the Lyapunov-like function-based classifier is as follows:

$$\text{LLFC}_V(x) = \max_{j \in [0, N-1]} V(x_j) - V(x_{j+1}) \quad \text{Eq. (7)}.$$

Essentially, the classifier computes the largest difference between the V(•) function evaluated on consecutive sample points in the output trace. Note that the term stability here refers to the output traces of the system rather than the internal stability of the system in the traditional sense. Namely, the results provide the following: "small perturbations on the input and the initial conditions lead to small perturbations on the output trajectories." As described in detail below, the convergence classifier functions 125 developed in, and outputted by, Phase I 120 are used as cost functions in the test generations performed in Phase II 130 (FIG. 3). Accordingly, the convergence classifier functions 125 are provided as inputs to Phase II 130.

Phase II—Test Generation for Stability Testing

Given a convergence classifier function in one of the forms specified in the previous section, Phase II 130 of the framework generates test cases (i.e., "tests") for the closed-loop model using an array of heuristic. Simply stated, output traces resulting from a test of the closed-loop model are inputted into the convergent classifier to calculate a convergent classifier function output value (i.e., "output value") for each output trace of the output traces inputted into the convergence classifier function.

A test generation procedure searches within the input space of the closed-loop model, i.e., in the space made up by the parameter space, the initial condition space and the input signal space. Each unique combination of an input signal value from within the input signal space, an initial condition value from within the initial condition space, and a parameter value constitutes a single test. An effective test generation procedure obtains an "interesting" set of tests—this is a subjective criterion depending on the closed-loop design under consideration. However, there have been some attempts to objectively measure the efficacy of a given test suite. Two prominent approaches include: (1) coverage-driven; here the efficacy of the test suite is measured by considering a statistical measure to quantify how well the search space is covered, and (2) property-driven; here, the efficacy is measured by the ability of the test suite to falsify a given stability test.

Embodiments described herein utilize the convergence classifier functions developed in Phase I 120 as a heuristic to significantly improve the search for stability test violations. Furthermore, depending on the search heuristic employed, test generation can be performed in a way that is coverage-driven or property-driven or both.

In some embodiments, a user provides a budget for the maximum number of simulations to be run (i.e., "NumSimulations"), and also assume that the user specifies the number of tests that they would like to obtain using the framework (i.e., "NumTests"). Generally, NumTests<NumSimulations.

In embodiments, a test generation scheme is any procedure that produces a certain number of tests ("NumTests") with a budget of NumSimulations. Control designers use simple test generation schemes based on uniform random or quasi-random sampling of the parameter space. However, the framework describe herein uses the convergence classifier functions of Phase I 120 to guide the test generation procedure to generate qualitatively better test results. It is desirable to determine output traces corresponding to small output values of the convergence classifier function, as smaller values correspond to qualitatively worse behaviors. Any output trace resulting from a parameter p for which the convergence classifier function produces a zero or negative value corresponds to behaviors for which $y \not\models \psi c$ (i.e., undesirable behaviors). Thus, a desirable test generation scheme attempts to find parameter values such that the resulting output traces minimize the convergence classifier function value. The test cases 132 (e.g., initial condition values, parameter values, and input signal values) that produce output values indicating undesirable behaviors as determined by the convergence classifier function may presented to the control designer, as shown in FIG. 3.

However, note that as M is a black-box system, there is no access to an explicit representation of a function that maps parameter values to output traces. Thus, it is not possible to apply white-box optimization approaches, such as gradient-descent that would pick a direction to minimize the convergence classifier function output value.

Although any appropriate black-box optimization technique may be used to attempt to minimize the convergence classifier function output value by computing it at finitely many parameter values, described below are several non-limiting black-box optimization techniques. Sampling-based and optimization-based test generation schemes are described below. It should be understood that other test generation schemes capable of minimizing the convergence classifier function output value may be utilized.

Sampling-Based Test Generators

It is noted that, as used herein, the term parameter value refers to a particular instance of system inputs, system parameter, and initial conditions. It should be understood that system inputs are assumed to be taken from a class of finitely parameterized input signals, such as sinusoids parameterized by amplitude and frequency or linearly interpolated signals based on a finite collection of control points, and so can be defined based on a finite number of parameters. The space of parameter values is denoted P herein.

Random Sampling-Based Test Generator.

The framework described herein supports a simple test generator scheme (denoted "UniRand" herein) that uses a uniform random sampling method to obtain a desired number of parameter values (e.g., NumSimulations parameter values), obtains the output traces for each parameter value, and then sorts them in ascending order based on the convergent classification value output values for the output trace. It reports the most interesting output values back to the user (i.e., the output values corresponding to the lowest output values of the convergent classifier function). These most interesting output values and their associated parameters may be displayed to the user in a graphical representation on a display device or reported to the user in another way.

Grid-Based Test Generator.

The grid-based test generator (denoted "Grid TG" herein) constructs a grid over the parameter space P to produce a desired number of grid points (e.g., at least NumSimulations number of grid points). Tests are generated using the parameter values corresponding to the grid points, thereby generating output traces for these parameter values. The selected convergence classifier is used to calculate output values for the generated output traces. The grid-based test generator then sorts the parameter values in ascending order of the value of the output value on the resulting output traces, and returns the most interesting parameter values to the user.

Adaptive Grid-Based Sampling Test Generator.

The adaptive grid-based sampling test generator is an adaptive scheme that applies the sensitivity of the convergence classifier function to the parameter values. This test generator is denoted as "A-Grid" herein. A disadvantage of the simple schemes outlined before is that they do disregard the underling (black-box) dynamics and use only limited guidance from the values of the convergence classifier function at the sampled parameter values. In contrast, A-Grid aims to guide sampling based on both of these factors. The intuition is as follows: the regions in the parameter space where the value of the convergence classifier function on the corresponding outputs is high and the sensitivity of the convergence classifier function to the parameter values is low are unlikely to contain parameter values that produce low convergence classifier output values, and are thus uninteresting with respect to falsification. On the contrary, parameter values where the corresponding output traces have either have a low convergence classifier function value or the sensitivity of the convergence classifier function to parameter value changes is high are interesting with respect to falsification, and such regions within the parameter space may be prioritized for further investigation. Prioritization in the interesting regions of the parameter space is achieved by sampling at a lower discrete grid-step, compared to that in the uninteresting regions.

Figure 6A:
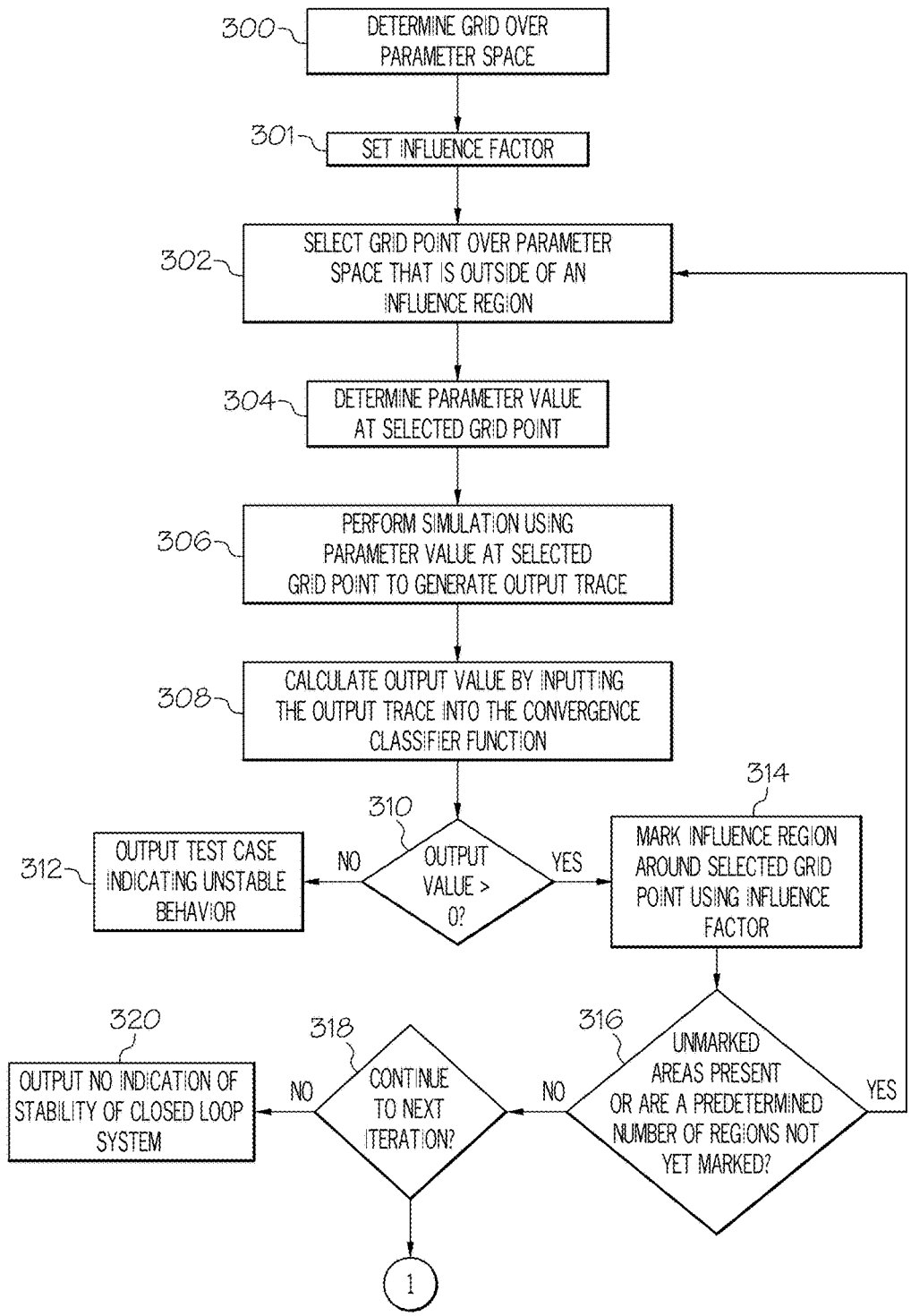
FIGS. 6A and 6B graphically depict flowcharts of an exemplary grid-based test generator method according to one or more embodiments described and illustrated herein.
Figure 6B:
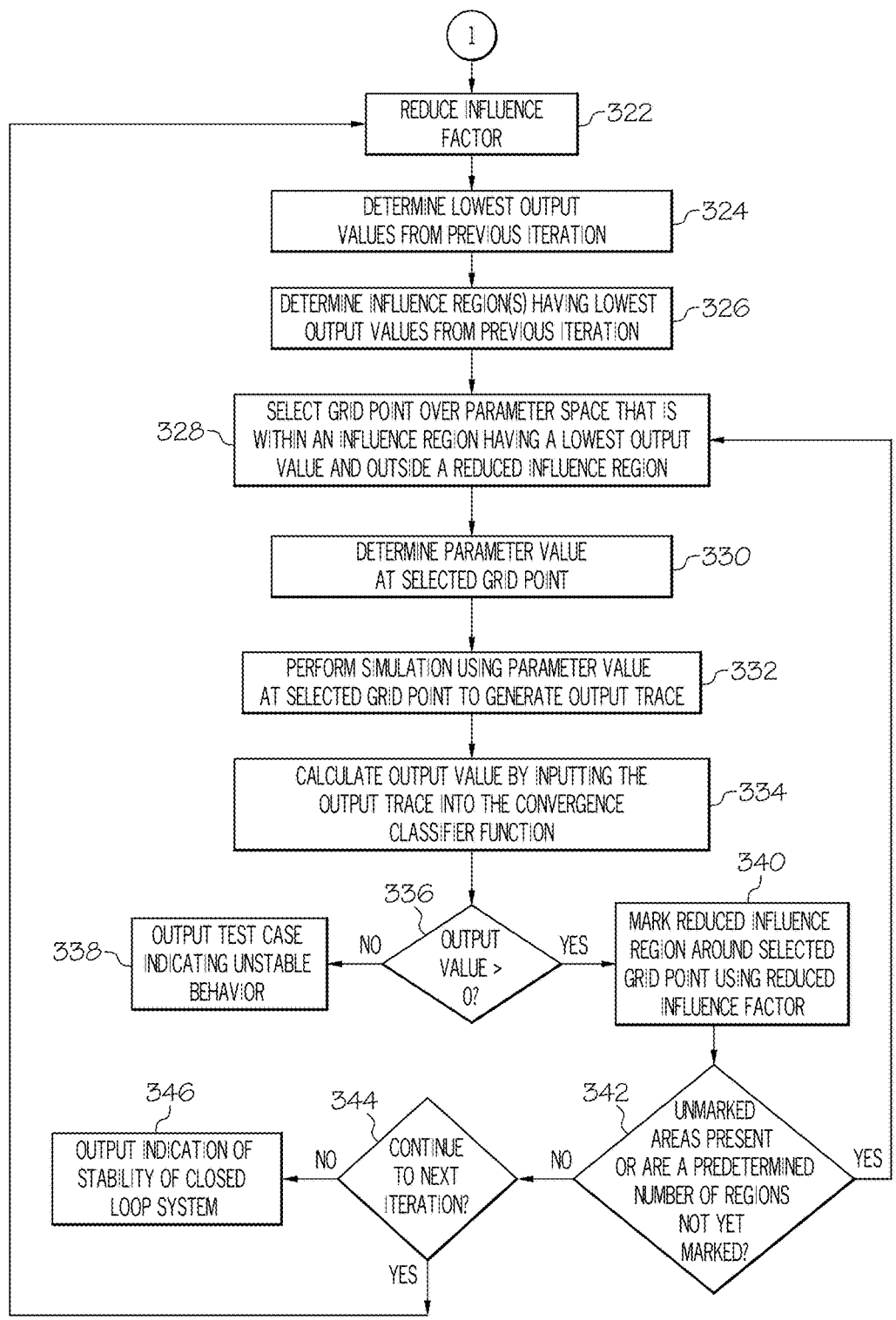
Figure 6C:
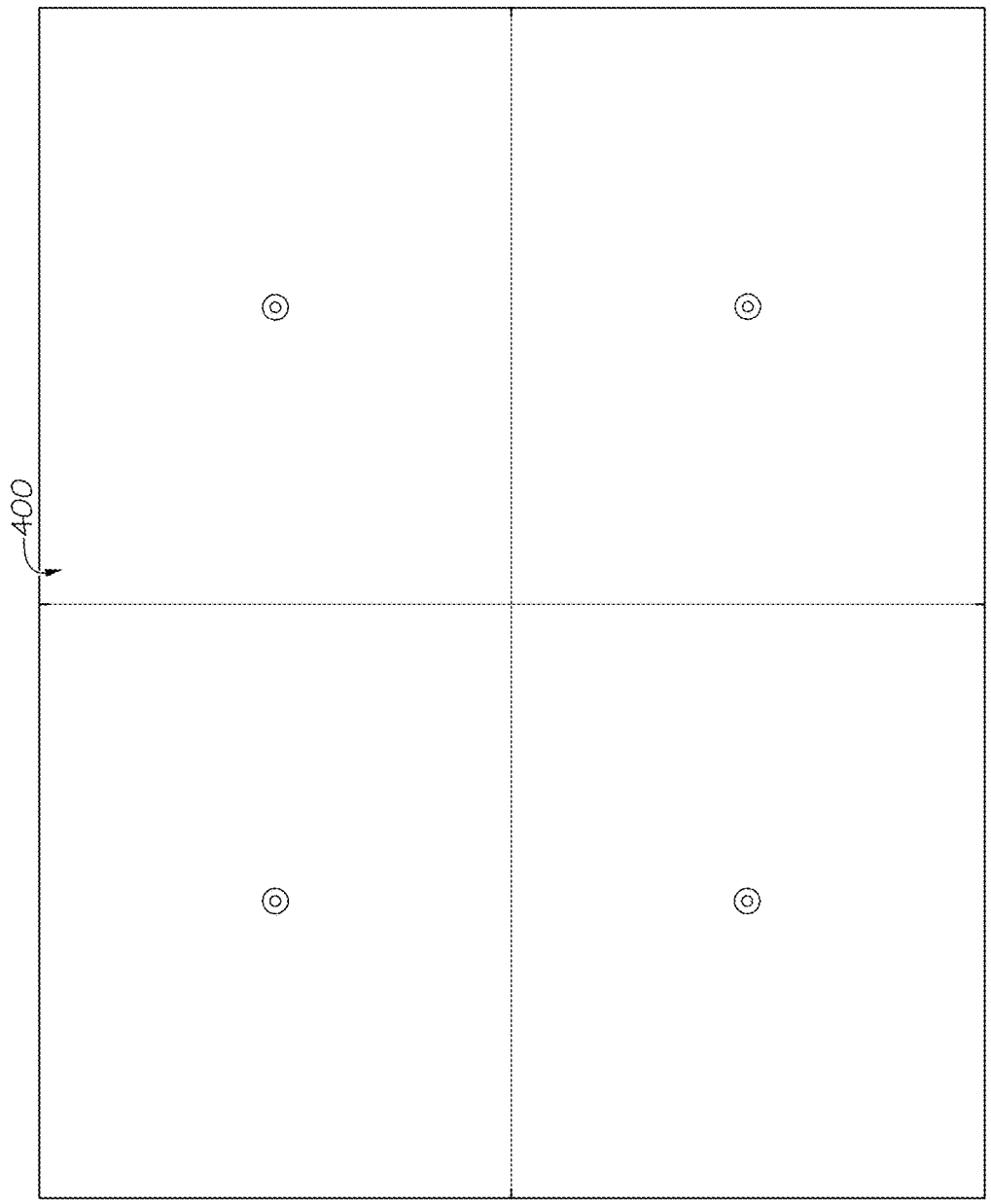

The A-Grid test generator is an iterative procedure. FIGS. 6A and 6B graphically depict an example A-grid test generator process. Referring first to FIG. 6A, a grid having a desired number of grid points is positioned over the parameter space at block 300. At block 301, the procedure fixes a real number called the influence factor for the first iteration represented by the flowchart of FIG. 6A. The process then proceeds at block 302 by selection of a grid point in the parameter space that is outside of any influence region described below. The parameter value corresponding with the selected grid point in the parameter space is determined at block 304. Simulation of the closed-loop model under evaluation is performed to generate an output trace for the selected parameter value at block 306.

At block 308, an output value for the output trace generated at block 306 is calculated using the selected convergence classifier function. It is determined at block 310 if the output value is greater than zero. If the answer is no, the process may terminate at block 312, where the test case values indicating non-convergent behavior are outputted to the user. Alternatively, the process may continue from block 312 back to block 302 to search additional parameter values within the parameter space.

If it is determined that the output value is greater than zero at block 310, the process continues to block 314, where an influence region is marked around the previously selected grid point. The area of the influence region is determined by influence factor. The larger the influence factor, the larger the influence region. Thus, the procedure marks a region of the input space centered at the input point being tested covered. The area of the region marked for a point is proportional to the influence factor for the particular iteration.

Next, the procedure moves to block 316 where it is determined if there are any areas of the grid that are unmarked (i.e., not covered), or if a predetermined threshold number of influence regions have been placed. If there are still unmarked areas of the grid, or if the predetermined threshold number of influence regions have not be placed, the process moves back to block 302 where another grid point from the parameter space that does not lie within any influence region is picked and the stability test is repeated.

If there are no unmarked areas of the grid that are present, or if a predetermined threshold number of influence regions have been marked, the process moves to block 318 where it is determined if another iteration of A-grid will be run. If not, the process moves to block 320, where an indication of stability of the closed-loop system is outputted. Alternatively, the most interesting parameter values may be outputted to the user (i.e., the parameter values corresponding to the lowest convergence classifier function output values.

If another iteration is to be run, the process moves from block 318 to block 322, where the influence function is reduced. At block 324, the lowest output values from the previous iteration are determined or otherwise recalled. These lowest output values correspond to parameter values that may be of the greatest interest to the control designer. Influence regions associated with these lowest output values are determined at block 326. Simply stated, the next iteration "zooms into" these one or more influence regions to search points within greater granularity. In embodiments, the pitch of the grid points of the grid is decreased (i.e., more grid points per area) from previous iterations.

At block 328, a grid point within a selected influence region having a lowest output value (and outside any previously marked reduced influence region of the current iteration). A parameter value of the grid point selected at block 328 is determined at block 330. A simulation of the parameter value is run to generate an output trace at block 332. At block 334, an output value for the output trace generated at block 332 is calculated using the selected convergence classifier function. It is determined at block 336 if the output value is greater than zero. If the answer is no, the process may terminate at block 338, where the test case values indicating non-convergent behavior are outputted to the user. Alternatively, the process may continue from block 336 back to block 328 to search additional parameter values within the parameter space.

If it is determined that the output value is greater than zero at block 336, the process continues to block 340, where a reduced influence region is marked around the previously selected grid point. The area of the reduced influence region is determined by the reduced influence factor of the current iteration.

Next, the procedure moves to block 342 where it is determined if there are any areas of the grid that are unmarked by reduced influence regions (i.e., not covered), or if a predetermined threshold number of reduced influence regions have been placed or otherwise marked. If there are still unmarked areas of the grid, or if the predetermined threshold number of reduced influence regions have not be placed, the process moves back to block 328 where another grid point from the parameter space within an influence region from the previous iteration that does not lie within any reduced influence region of the current iteration is picked and the stability test is repeated.

If there are no unmarked areas within the influence region of the previous iteration that are present, or if a predetermined threshold number of reduced influence regions have been marked, the process moves from block 342 to block 344 where it is determined if another iteration of A-grid will be run. If not, the process moves to block 346, where an indication of stability of the closed-loop system is outputted. Alternatively, the most interesting parameter values may be outputted to the user (i.e., the parameter values corresponding to the lowest convergence classifier function output values. If it is determined at block 344 that another iteration of A-Grid is to be run, the process moves back to block 322, where the influence factor is again reduced and the process continues.

In embodiments, the procedure is parameterized by the following: initial influence factor ($\omega_0$), factor by which to reduce the influence factor $\lambda$, number of iterations NumIter, and the number of points to carry forward in each iteration k. A pseudo code of this procedure is provided below in Algorithm 1.

---
Algorithm 1
---

```
begin
    region ← Entire Input Space
    ω ← ω₀
    while (iteration_number < NumIter)
        list ← ∅
        while (region ≠ ∅)
            sample u from region
            if (C(M(u)) < 0)
                halt
            else
                influence_region(u) ← {v | d(u,v) < ω}
                Mark influence_region(u) "covered"
                region ← region \ influence_region(u)
                if C(M(u)) is in bottom k values seen so far
                    list ← update bottom k points list
                endif
            endif
        endwhile region ←   ⋃    influence_region(u)
                 u∈list
```

Algorithm 1

```
        ω ← ω · λ
        iteration_number ← iteration_number + 1
    endwhile
end
```

An enabler for this search-heuristic to be effective is an assumption of sensitivity of the model outputs and the convergence classifier function to changes in the input. Mathematically, this can be summarized by the following inequality:

$$d_O(C(M(u)), C(M(u'))) \leq \kappa d_I(u, u')$$

Here $d_O$, $d_I$ are metrics on the space of real numbers and inputs respectively, and $\kappa$ is a positive real number. If the model M and the convergence classifier C are such that the above inequality is satisfied for a reasonably small positive number $\kappa$, then Algorithm 1 is very effective at finding possible stability test violations, as well as covering the parameter search space. Roughly speaking, the influence factor in Algorithm 1 can be then chosen to be inversely proportional to such a $\kappa$.

FIGS. 6C-6F graphically illustrate the application of A-Grid over a parameter space P over the course of four consecutive iterations. Referring to the first iteration depicted in FIG. 6C, a grid 400 is positioned over the parameter space. The non-shaded circles represent grid points (and therefore corresponding parameter values) that will be chosen for evaluation in the next iteration. Note that the grid 400 is coarse in FIG. 6C and that only four grid points are chosen for evaluation.

Figure 6E:
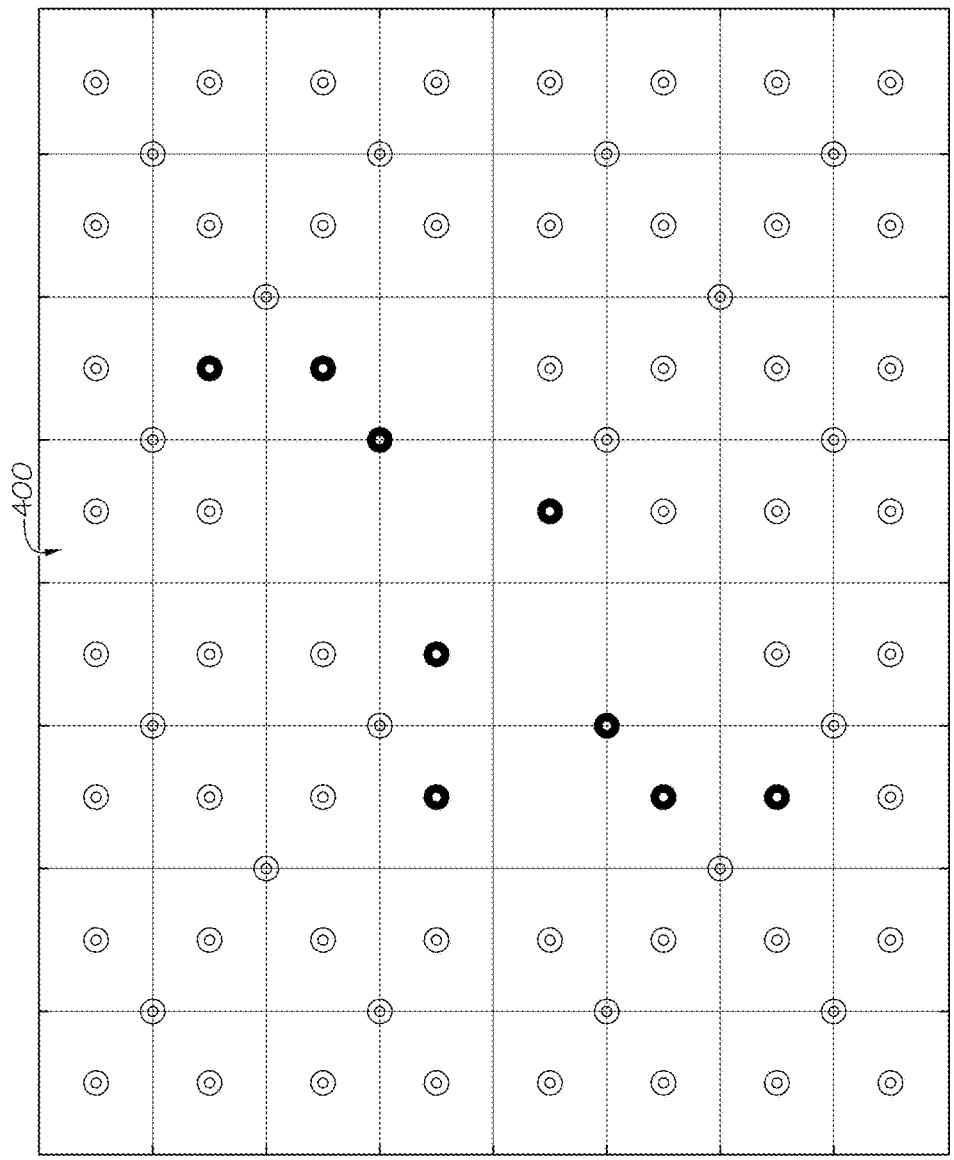
Figure 6F:
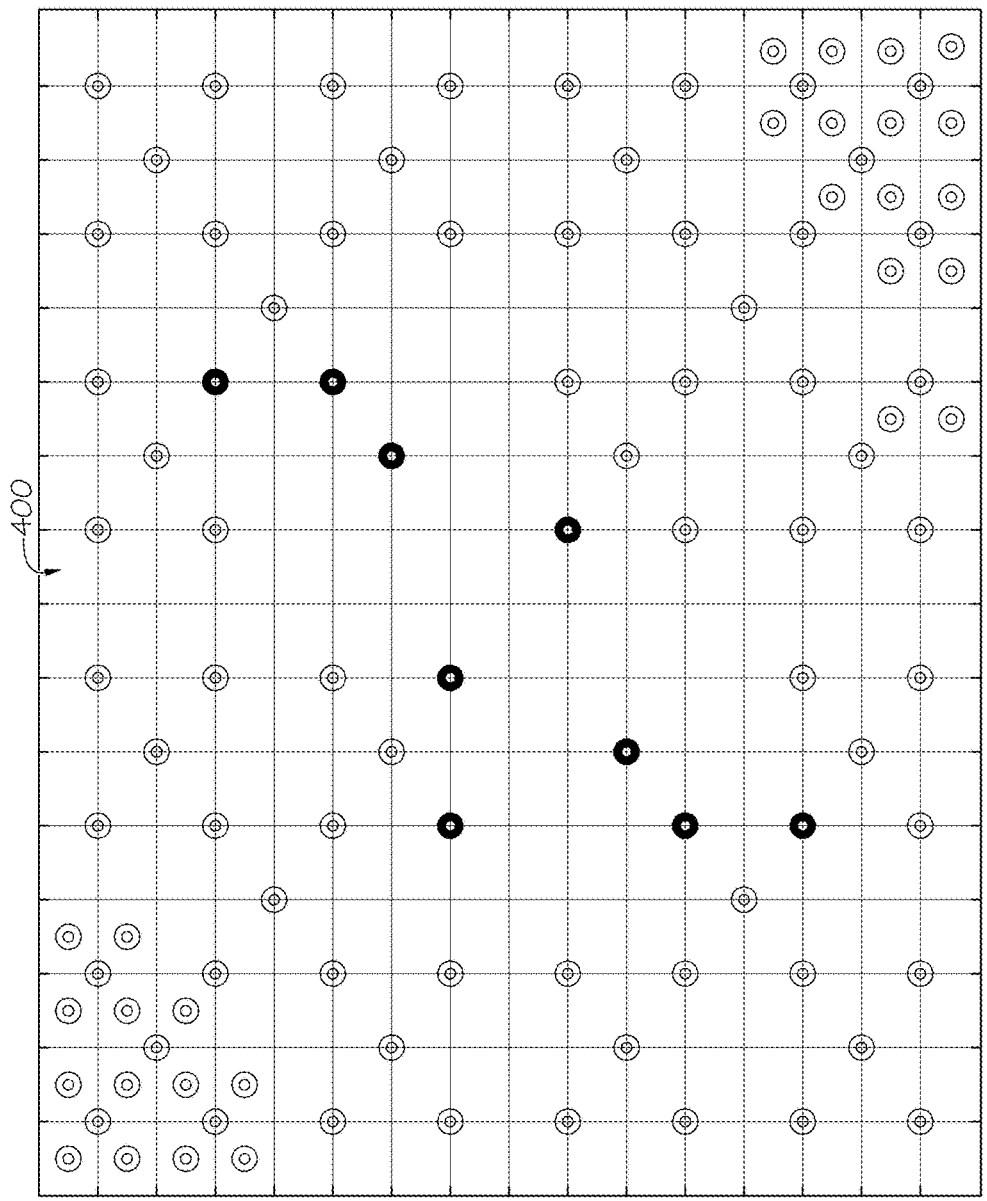

FIG. 6D graphically illustrates a second iteration of A-Grid. The grid 400 is now finer and more grid points are selected for evaluation in the next iteration. In the illustrated example, the two shaded circles represent grid points that will not be carried to the next iteration. As an example, the parameter values associated with the shaded circles may not be interesting as defined by the selected convergence classifier function. In some embodiments, no grid points within the cell of the grid 400 containing a grid point marked to not be carried to the next iteration will be selected for evaluation. FIGS. 6E and 6F illustrate successive iterations wherein the grid 400 becomes finer and additional grid points are precluded from evaluation in subsequent iterations. It should be understood that FIGS. 6C-6F are for illustrative purposes only, and that any number of iterations may be completed.

Optimization-Based Test Generators

Optimization-based test generators are typically property-driven search procedures. A global optimizer may be utilized to do property-driven testing. A search procedure may be defined such that the optimizer has the liberty to choose inputs from a search space, and use the convergence classifier function from Phase I as a cost function. The optimizer then tries to minimize this cost function. As non-limiting examples, tools such as S-TaLiRo (see Annapureddy, Y. S. R., Liu, C., Fainekos, G. E., Sankaranarayanan, S.: S-TaLiRo: *A Tool for Temporal Logic Falsification for Hybrid Systems. In: Proc. of Tools and Algorithms for the Construction and Analysis of Systems.* pp. 254-257 (2011)) and Breach (see Donzé, A.: Breach, a toolbox for verification and parameter synthesis of hybrid systems. In Proceedings of the 22$^{nd}$ International Conference on Computer Aided Verification. 2010) use specifications given as temporal logic formulae to represent correct system behavior, and then formulate a cost function that is evaluated over system output traces. If the minimum value discovered by the optimizer is less than zero, then a violation of the stability test is obtained. In the process of searching for such violating inputs, the optimizer explores the input search space, thereby generating tests.

In the experimental examples described below, a stochastic global optimizer based on a Nelder-Mead approach was used as a falsification tool. This test generator scheme is denoted as Seed-NM herein. The Nelder-Mead method or downhill simplex method is a heuristic search method that can converge to suboptimal points. For cost functions that have a highly nonlinear relation with the search variables, the Nelder-Mead method can spend several iterations doing local refinements in a suboptimal region. Hence, the experimental examples described below employ a modified version of Nelder-Mead such as the one used in the tool Breach, where we start the heuristic search from a number of randomly chosen initial points in the search space known as "seeds." This allows the Seed-NM TG to mitigate the possibility of a traditional Nelder-Mead optimizer converging to a sub-optimal region, while allowing the optimizer to more thoroughly explore the parameter/input space.

Referring to FIG. 3, in any of the test generator cases, the framework may at block 134 provide an indication to the designer regarding how much, and/or what portions, of the parameter space was evaluated by the particular test generator(s). In this manner, the control designer may feel confident that a sufficient portion of the parameter space was evaluated.

EXPERIMENTAL EXAMPLES

This section describes an empirical evaluation of framework described above on textbook examples of dynamical systems. For each of the examples in this section, an explicit representation of the system dynamics is presented. However, this knowledge is not used during the experiments, and therefore the experiments effectively treat each system as a black-box.

Two sets of examples are considered. The dynamical systems in the first set are known to be not globally asymptotically stable. For these systems, the two-phase framework described herein is used to automatically identify parameter values that lead to non-convergent traces. In the second set, dynamical systems whose output trajectories seem to have convergent behavior, yet could have output trajectories that have undesirable transient behavior such as high overshoots or slow settling time are considered.

In the experiments below, unless otherwise specified, three kinds of convergent classifier functions were benchmarked: Sum-of-Squares Lyapunov-like function (SoS LLF), M-step Lyapunov-like function (M-step LLF), and signal temporal logic convergence classifier function (STL CCF). Four different test generation (TG) methods were also benchmarked. In the first TG method denoted "UniRand," we parameter values were generated using uniform random sampling. In the second TG method (Grid), grid points that lie on a uniform grid in the parameter space were used to generate parameter values for testing. The third TG method (Seed-NM) used a stochastic global Seed-NM based on the Nelder-Mead approach. The fourth TG method ("A-Grid") used an adaptive search strategy that combines a grid-based search with local sensitivity estimation, as described above with respect to FIGS. 6A and 6B.

When learning the SoS LLF and M-step LLF in Phase I, the user is able to specify the number of randomly sampled parameter values (denoted NumCCFSeeds) to generate traces to learn the convergence classifier function. The user may also specify the method of sampling as uniform random or quasi random. In Phase II, it is assumed that the user provides a budget for the maximum number of simulations to be run (denoted NumSimulations), and also assumed that the user specifies the number of tests that they would like to obtain (denoted NumTests). It was required that NumTests<NumSimulations.

Experimental Example 1—Time-Reversed Van Der Pol Example

The first experimental example considered is the time-reversed version of van der Pol oscillator dynamics. The dynamics can be described by the following set of ODEs:

$$\dot{x}_1 = x_2$$

$$\dot{x}_2 = -(1-x_1^2)x_2 + x_1$$

$$y = x \quad \text{Eq. (8)}.$$

The unique equilibrium of the system is at x=0. The origin is a locally asymptotically stable equilibrium point, but is not globally asymptotically stable. Thus, some trajectories asymptotically converge to the equilibrium, while others are non-convergent. For both the SoS LLF and M-step LLF we use NumCCFSeeds=75, NumSimulations=75, and NumTests=20. Table 1 below summarizes the results for Experimental Example 1, as well as Experimental Example 2 describe below. For each of the CCF and TG methods, the ratio of non-convergent test cases to the number of total generated test cases is provided and denoted by $r_{div}$.

Since the initial conditions that lead to diverging traces are confined in a small region of the parameter space, UniRand using random sampling produces the least number of interesting tests. All TG methods for each CCF perform fairly well; this is expected as the output trajectories that start outside the region of attraction cause a drastic decrease in the value of the CCF. It is also noted that for M-step LLF and SoS LLF, A-Grid TG has worse behavior compared to Grid TG. In this experiment, the restriction that the TG methods can only explore 75 points in the parameter/input space was applied. This prevents A-Grid from effectively exploring the parameter/input space as compared to Grid TG. A-Grid TG may be unable to eliminate the regions in the parameter space corresponding to converging trajectories early enough in the algorithm. Thus, it may not be able to focus on the regions of the parameter space that correspond to non-convergent behavior. On the other hand, desired behavior is achieved when STL CCF is used as the convergence classifier functions.

Experimental Example 2—not Stable System

The next example we consider is defined by Sastry, S. S.: Nonlinear systems: analysis, stability, and control. Interdisciplinary applied mathematics, Springer, New York (1999), http://opac.inria.fr/record=b1096455, numérotation dans la coll. principale, with dynamics given by:

$$\dot{x}_1 = x_1^2 - x_2^2$$

$$\dot{x}_2 = 2x_1 x_2 \quad \text{Eq. (10)}$$

Figure 7:
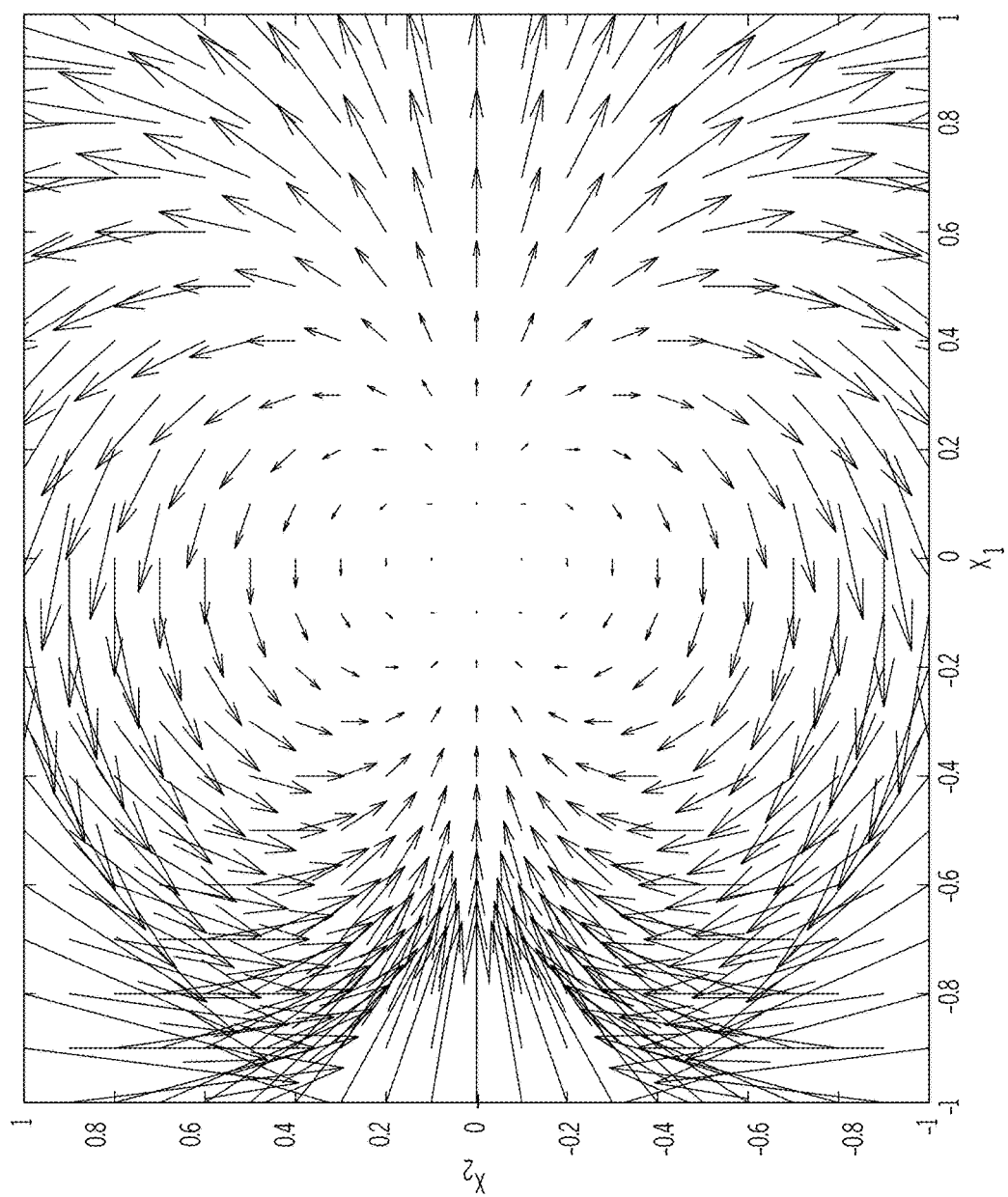
FIG. 7 graphically depicts an example non-stable system.

FIG. 7 illustrates a phase portrait of the system given by Eq. (1). As FIG. 7 illustrates, the trajectories of this system are peculiar because all trajectories converge to the origin except for the trajectory that follows the positive $x_1$ axis, which is goes to +00. Therefore, in this example, a good test generator method is expected to provide several test cases closer to the $x_1$ axis in the positive direction. The convergent classifier functions and test generators for this example were generated with the parameters NumCCFSeeds=35, NumSimulations=300, and NumTests=80. In Table 2, the average overshoot of the trajectories that are generated using different test generator methods and convergent classifier functions are provided. $T_{TG}$ denotes the computations time for the corresponding test generator in seconds. As can be seen from Table 2, the Grid TG and the Seed-NM TG have the best performance among the evaluated test generators.

TABLE 1

| CCF | TG | Number of NonConvergent Outputs Number of Convergent Outputs | Time Required for TG (secs) |
|---|---|---|---|
| SOS LLF | UniRand | 0.45 | 27.6 |
| | Seed-NM | 1.0 | 21.0 |
| | Grid | 0.8 | 23.9 |
| | A-Grid | 0.7 | 31.6 |
| MStep LLF | UniRand | 0.45 | 2.1 |
| | Seed-NM | 1.0 | 4.9 |
| | Grid | 0.8 | 2.7 |
| | A-Grid | 0.7 | 187 |
| STL CCF | UniRand | 0.45 | 1.7 |
| | Seed-NM | 1.0 | 17.7 |
| | Grid | 0.8 | 1.7 |
| | A-Grid | 1 | 41 |

TABLE 2

| CCF | TG | Avg. Settling Time | Avg. Overshoot | Time required for TG (secs) |
|---|---|---|---|---|
| SOS LLF | UniRand | 11.1 | 6.7 | 141 |
| | Seed-NM | 11.5 | 31.4 | 99 |
| | Grid | ∞ | ∞ | 139 |
| | A-Grid | 11.1 | 6.7 | 166 |
| M-Step LLF | UniRand | 11.3 | 6.3 | 8 |
| | Seed-NM | 11.4 | 25.6 | 4 |
| | Grid | ∞ | ∞ | 9 |
| | A-Grid | 11.1 | 2.9 | 18 |
| STL CCF | UniRand | 11.8 | 6.6 | 346 |
| | Seed-NM | ∞ | ∞ | 18 |
| | Grid | ∞ | ∞ | 252 |
| | A-Grid | 11.8 | 6.6 | 361 |

While the Seed-NM TG was able to identify trajectories that are not converging for only the STL CCF, the Grid TG consistently outputs these diverging traces for all convergent classifier functions. This is because Grid TG samples parameter values exactly on the $x_i$ axis independently of the convergence classifier function. Note that, even though A-Grid explores the regions in parameter space where the output trajectories exhibit high overshoot, Seed-NM TG has better performance in terms of the average settling time and average overshoot. This is due to the fact that Seed-NM TG can generate trajectories corresponding to parameter configurations that are arbitrarily close to each other as opposed to A-Grid TG, whose parameter configurations lie on a grid of a certain size.

Figure 8:
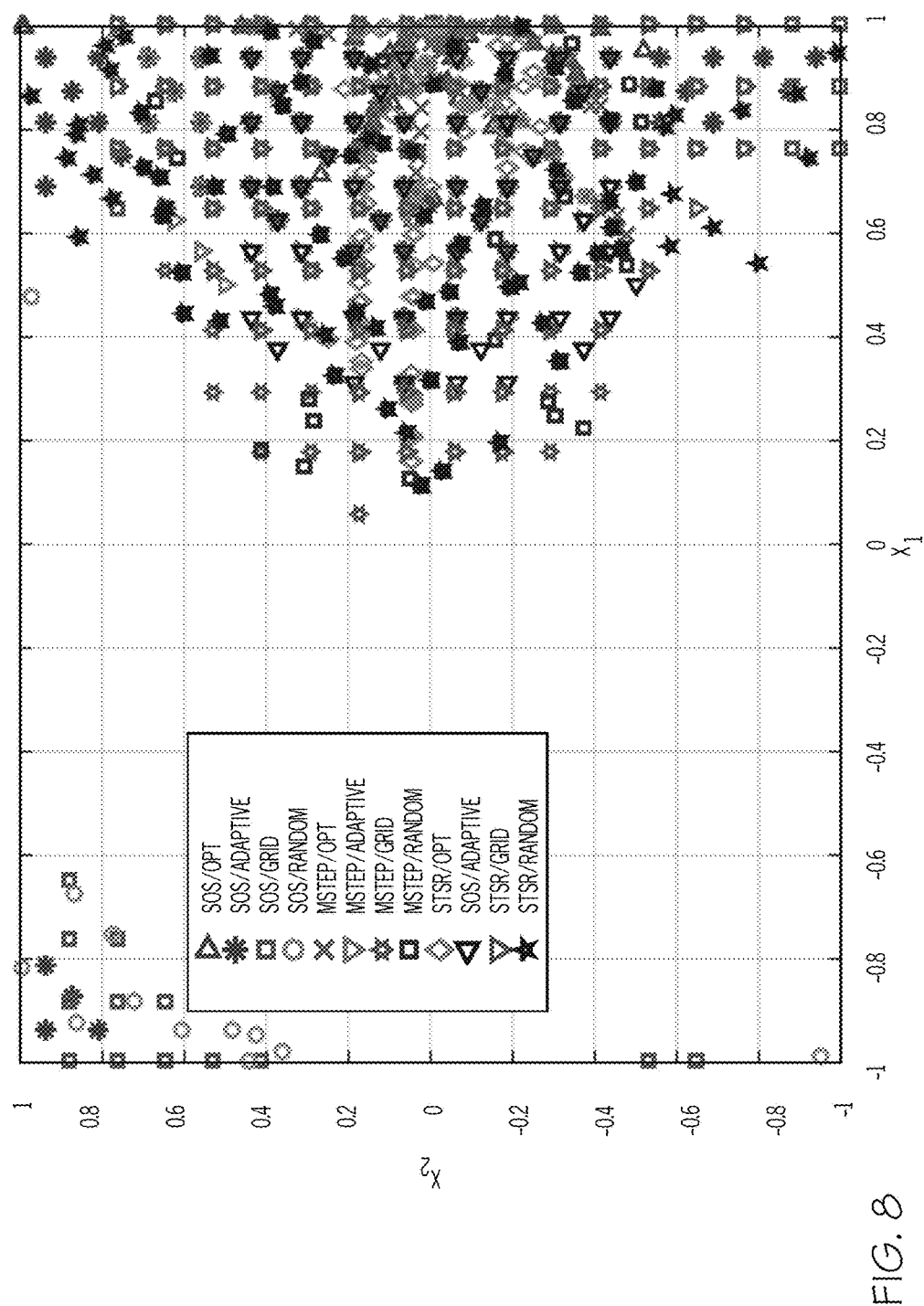
FIG. 8 graphically depicts an illustration of test cases selected by various test generators in the non-stable system illustrated in FIG. 7.

FIG. 8 graphically depicts the parameter values explored by the various test generator methods using the three kinds of convergence classifier functions in Example 2. The Seed-NM and A-Grid test generator methods have a higher number of parameter values explored in the neighborhood of the positive direction of the $x_1$ axis. This shows that the guidance provided by the convergence classifier functions is able to steer the test generator methods towards the region in the parameter space containing non-convergent behaviors for this example system.

It should now be understood that embodiments described herein provide for automated techniques to identify non-converging behaviors in embedded control system designs. The processes described herein treat the system as a black-box, and allow the control designer to indicate the model parameters, inputs and outputs that are of interest. The processes described herein support a multiplicity of convergence notions, such as Lyapunov analysis and convergence requirements based on temporal logic formulae. Embodiments may be applied in the context of testing models created in the controller-design phase, or it can be applied in a scenario such as hardware-in-the-loop testing.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of evaluating a stability of a control system, the method comprising:
   generating, using a processing device, one or more convergence classifier functions from a closed-loop model, wherein the one or more convergence classifier functions convey convergent behavior of the closed-loop model over a pre-determined period of time;
   generating, using the processing device, a plurality of test cases of an input space of the closed-loop model under evaluation; and
   determining, using the processing device, whether one or more individual test cases of the plurality of test cases do not satisfy the one or more convergence classifier functions, wherein test cases that do not satisfy the one or more convergence classifier functions are indicative of non-converging behavior of the control system.

2. The method of claim 1, wherein:
   the input space comprises a parameter space, an initial condition space, and an input signal space; and
   each test case of the plurality of test cases comprises a combination of a parameter value within the parameter space, an initial condition value within the initial condition space, and an input signal value of the input signal space.

3. The method of claim 1, wherein a type of the one or more convergence classifier functions is user-selectable.

4. The method of claim 1, further comprising outputting one or more test cases of the plurality of test cases that do not satisfy the one or more convergence classifier functions.

5. The method of claim 4, wherein outputting the one or more test cases of the plurality of test cases that do not satisfy the one or more convergence classifier functions comprises displaying the one or more test cases of the plurality of test cases that do not satisfy the one or more convergence classifier functions on a display device.

6. The method of claim 1, wherein:
   the one or more convergence classifier functions is a signal temporal logic convergence classifier function; and
   an individual test case of the plurality of test cases satisfies the signal temporal logic convergence classifier function when an output trace of the individual test case remains within a setting region after a settling time.

7. The method of claim 1, wherein the one or more convergence classifier functions is a Lyapunov-like function from a range of an output trace of a signal from x to R, such that:
   $V(x_j) > 0$ for all j in [0, N], and
   $V(x_j) - V(x_{j+1}) > \alpha(|x|)$ for all j in [0, N−1], where $\alpha$ is an increasing and continuous function such that $\alpha(0)=0$.

8. The method of claim 7, wherein the Lyapunov-like function is determined by:
   receiving a set of initial trajectories from the closed-loop model;
   determining, by a semidefinite programming solver module or a linear programming solver module, one or more candidate Lyapunov-like functions based on the set of initial trajectories; and
   performing a plurality of simulations using to create a set of discovered trajectories.

9. The method of claim 8, wherein the Lyapunov-like function is a sum-of-squares Lyapunov-like function defined by $z(x_0)^T M z(x_0)$, wherein M is a n×n matrix of numbers, and z is a vector of monomials over x, and $x_0$ is an initial value for an output trace.

10. The method of claim 8, wherein the Lyapunov-like function is an M-step Lyapunov-like function defined by $y^T M y$, where y is a vector representing an n-dimensional signal x over an output trace of length N, and M is an nN×nN matrix.

11. The method of claim 1, wherein the one or more convergence classifier functions is an ISS Lyapunov-like function from a range of an output trace of a signal from x to R, such that:
   $V(x_j) > 0$ for all j in [0, N], and
   $V(x_j) - V(x_{j+1}) > \alpha(|x|) - y(|u|)$ for all j in [0, N−1], where $\alpha$ and $\gamma$ are strictly increasing and continuous functions such that $\alpha(0)=0$ and $\gamma(0)=0$.

12. The method of claim 1, wherein determining whether one or more individual test cases of the plurality of test cases do not satisfy the one or more convergence classifier functions comprises, for individual test cases of the plurality of test cases:
   performing a simulation to generate an output trace at least some test cases of the plurality of test cases;
   inputting the output trace into the one or more convergence classifier functions to calculate one or more output values, wherein:
     when the one or more output values is greater than zero, an individual test case satisfies the one or more convergence classifier functions; and
     when the one or more output values is less than or equal to zero, the individual test case does not satisfy the one or more convergence classifier functions.

13. The method of claim 1, wherein the plurality of test cases are determined by a global optimizer that is configured to determine one or more test cases of the plurality of test cases that minimize an output value of the one or more convergence classifier functions.

14. The method of claim 1, wherein the plurality of test cases are determined by a sampling process.

15. The method of claim 14, wherein the sampling process comprises:
   randomly selecting parameter values of a parameter space of the closed-loop model; and obtaining output traces corresponding to the parameter values.

16. The method of claim 14, wherein:
the closed-loop model comprises a parameter space comprising a plurality of parameter values; and
the sampling process comprises:
  positioning a grid over the parameter space, wherein points of the grid corresponding with parameter values of the parameter space; and
  obtaining output traces corresponding to the parameter values corresponding to the points of the grid.

17. The method of claim 14, wherein the closed-loop model comprises a parameter space comprising a plurality of parameter values, and the sampling process comprises an adaptive grid process, the adaptive grid process further comprising:
  positioning a grid over the parameter space, wherein points of the grid corresponding with parameter values of the parameter space;
  establishing an influence factor;
  selecting a grid point of the grid;
  determining an output trace of the closed-loop model using a parameter value corresponding with the selected grid point of the grid;
  inputting the output trace into the one or more convergence classifier functions to calculate one or more output values;
  when the one or more output values is greater than zero, marking a region of the grid as an influence region, wherein an area of the influence region is determined by the influence factor;
  when the one or more output values is less than or equal to zero, outputting the parameter value; and
  selecting additional grid points of the grid outside of the influence region to mark additional influence regions until an entirety of the grid is marked with a plurality of influence regions or the grid is marked with a predetermined number of influence regions.

18. The method of claim 17, further comprising:
  determining a plurality of grid points having a plurality of lowest output values and corresponding influence regions containing at least one grid point of the plurality of grid points having the plurality of lowest output values;
  reducing the influence factor to set a reduced influence factor;
  selecting an individual grid point within a selected influence region containing at least one grid point of the plurality of grid points having the plurality of lowest output values;
  determining an output trace of the closed-loop model using the parameter value corresponding with the selected grid point of the plurality of grid points having the plurality of lowest output values;
  inputting the output trace into the one or more convergence classifier functions to calculate one or more additional output values;
  when the one or more additional output values is greater than zero, marking a region of the grid as a reduced influence region, wherein an area of the reduced influence region is determined by the reduced influence factor;
  when the one or more additional output values is less than or equal to zero, outputting the parameter value; and
  selecting additional grid points of the grid outside of the reduced influence region to mark additional reduced influence regions until all the influence regions containing at least one grid point of the plurality of grid points having a lowest output value are covered with reduced influence regions or the grid is marked with a predetermined number of reduced influence regions.

19. The method of claim 1, wherein the closed-loop model comprises a parameter space, and the method further comprises displaying, on a display device, a graphical representation of the parameter space that was tested by the plurality of test cases.

20. A system for evaluating a stability of a control system comprising:
  one or more processing devices;
  a non-transitory computer-readable medium storing computer-executable instructions that, when executed by the one or more processing devices, causes the one or more processing devices to:
    generate one or more convergence classifier functions from a closed-loop model, wherein the one or more convergence classifier functions convey convergent behavior of the closed-loop model over a pre-determined period of time;
    generate a plurality of test cases of an input space of the closed-loop model under evaluation; and
    determine whether one or more individual test cases of the plurality of test cases do not satisfy the one or more convergence classifier functions, wherein test cases that do not satisfy the one or more convergence classifier functions are indicative of non-converging behavior of the control system.

* * * * *

UNITED STATES PATENT AND TRADEMARK OFFICE
CERTIFICATE OF CORRECTION

PATENT NO. : 10,429,811 B2
APPLICATION NO. : 15/093975
DATED : October 1, 2019
INVENTOR(S) : Jyotirmoy V. Deshmukh et al.

It is certified that error appears in the above-identified patent and that said Letters Patent is hereby corrected as shown below:

On the Title Page

In page 2, Column 1, item (56), references cited, other publications, cite no: 6, delete "R. Alur et al, Automatic symbolic verification of embedded systems. IEEE Transactions on Software Engineering, *22(3)181-201*, Mar. 1996."
And insert --R. Alur et al, Automatic symbolic verification of embedded systems. IEEE Transactions on Software Engineering, *22(3):181-201*, Mar. 1996.--, therefor.

In page 2, Column 2, item (56), references cited, other publications, cite no: 8, delete "Donze, "Breach, a toolbox for verification and parameter Synthesis of hybrid systems," Verimag Laboratory 2, http://www-verimag.*imag_fr*/-donze/tool.shtml (4 pages, undated)."
And insert --Donze, "Breach, a toolbox for verification and parameter Synthesis of hybrid systems," Verimag Laboratory 2, http://www-verimag.*imag.fr*/-donze/tool.shtml (4 pages, undated).--, therefor.

In page 2, Column 2, item (56), references cited, other publications, cite no: 17, delete "<*Apinski et al*, "Discovering forward invariant sets for Nonlinear dynamical systems," Toyota Technical Center (6 pages, undated)."
And insert --*Kapinski et al*, "Discovering forward invariant sets for Nonlinear dynamical systems," Toyota Technical Center (6 pages, undated).--, therefor.

In the Specification

In Column 10, Line 21, delete "counter example" and insert --counterexample--, therefor.

Signed and Sealed this
Third Day of December, 2019

Andrei Iancu
*Director of the United States Patent and Trademark Office*